United States Patent
Kwon

(10) Patent No.: US 12,114,377 B2
(45) Date of Patent: Oct. 8, 2024

(54) ELECTRONIC DEVICE AND METHOD FOR CONNECTING DEVICE THEREOF

(71) Applicant: Samsung Electronics Co., Ltd., Suwon-si (KR)

(72) Inventor: Ohchae Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/686,931

(22) Filed: Mar. 4, 2022

(65) Prior Publication Data

US 2022/0287110 A1 Sep. 8, 2022

Related U.S. Application Data

(63) Continuation of application No. PCT/KR2022/002504, filed on Feb. 21, 2022.

(30) Foreign Application Priority Data

Mar. 5, 2021 (KR) .......................... 10-2021-0029562

(51) Int. Cl.
*H04W 76/10* (2018.01)
*G06F 3/16* (2006.01)
(Continued)

(52) U.S. Cl.
CPC .............. *H04W 76/10* (2018.02); *G06F 3/16* (2013.01); *G06F 40/279* (2020.01); *G10L 15/26* (2013.01); *H04L 67/10* (2013.01)

(58) Field of Classification Search
CPC ........ H04W 76/10; G06F 40/279; G06F 3/16; G10L 15/26; H04L 67/10
See application file for complete search history.

(56) References Cited

U.S. PATENT DOCUMENTS 9,318,108 B2 *  4/2016  Gruber ...................... G06F 9/54
9,564,129 B2 *  2/2017  Amano ................. G10L 15/222
(Continued)

FOREIGN PATENT DOCUMENTS

KR   10-2010-0122027 A   11/2010
KR   10-2012-0054743 A    5/2012
(Continued)

OTHER PUBLICATIONS

International Search Report dated May 30, 2022, issued in International Application No. PCT/KR2022/002504.

*Primary Examiner* — Raqiul A Choudhury
(74) *Attorney, Agent, or Firm* — Jefferson IP Law, LLP

(57) ABSTRACT

An electronic device for performing device connection based on a user voice, and a device connection method of the electronic device are provided. The method includes determining an operation mode of an electronic device based on a user input, based on determining of a first operation, producing a string and connection information for device connection to another electronic device, transmitting the string and connection information to the outside, awaiting reception of a connection request from the other electronic device based on the connection information, and performing connection to the other electronic device based on reception of the connection request, and based on determining of a second operation, receiving a user utterance, obtaining a string and connection information related to device connection to another electronic device, and performing connection to the other electronic device based on the connection information if the user utterance and the string are identical.

5 Claims, 15 Drawing Sheets

(51) Int. Cl.
   *G06F 40/279*   (2020.01)
   *G10L 15/26*    (2006.01)
   *H04L 67/10*    (2022.01)

(56)             References Cited

U.S. PATENT DOCUMENTS

| | | | |
|---|---|---|---|
| 10,228,903 | B2 | 3/2019 | Kang et al. |
| 10,657,963 | B2 | 5/2020 | Cha et al. |
| 10,950,230 | B2* | 3/2021 | Kojima .................. G10L 15/22 |
| 2006/0116107 | A1 | 6/2006 | Hulvey |
| 2010/0286801 | A1 | 11/2010 | Yum et al. |
| 2012/0127072 | A1 | 5/2012 | Kim |
| 2015/0026580 | A1* | 1/2015 | Kang .................... H04W 12/04 |
| | | | 455/39 |
| 2017/0093510 | A1* | 3/2017 | Lin ....................... H04R 27/00 |
| 2018/0047406 | A1* | 2/2018 | Park ...................... G10L 15/22 |
| 2018/0367489 | A1* | 12/2018 | Dye ....................... H04L 51/42 |
| 2020/0082827 | A1 | 3/2020 | Lee et al. |
| 2020/0135194 | A1 | 4/2020 | Jeong |
| 2021/0287666 | A1* | 9/2021 | Harris ................... G10L 15/18 |

FOREIGN PATENT DOCUMENTS

| | | |
|---|---|---|
| KR | 10-2013-0042397 A | 4/2013 |
| KR | 10-2015-0010517 A | 1/2015 |
| KR | 10-2016-0089782 A | 7/2016 |
| KR | 10-2018-0119070 A | 11/2018 |
| KR | 10-2018-0122106 A | 11/2018 |
| KR | 10-2088322 B1 | 3/2020 |

\* cited by examiner

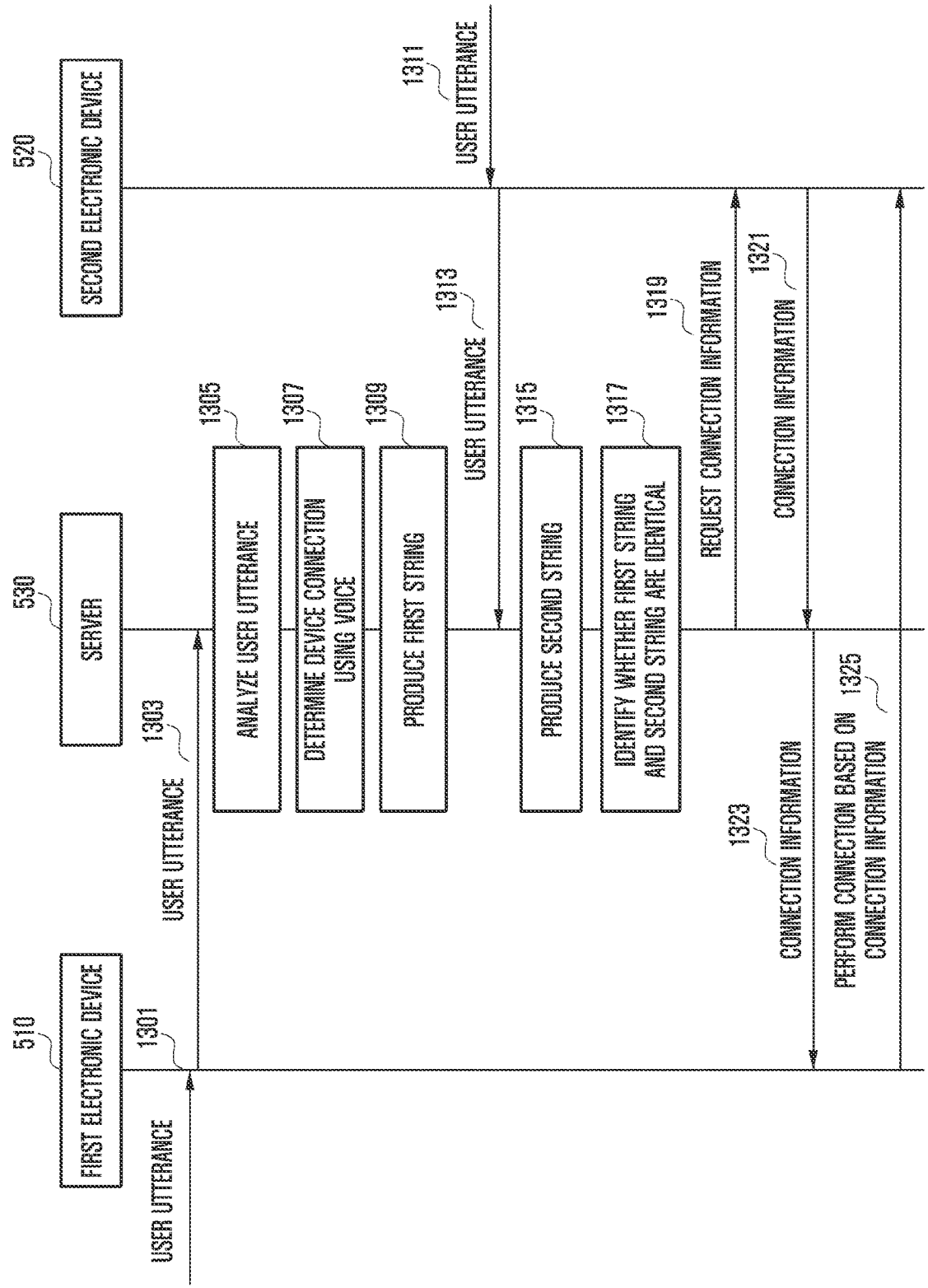

ELECTRONIC DEVICE AND METHOD FOR CONNECTING DEVICE THEREOF

CROSS-REFERENCE TO RELATED APPLICATION(S)

This application is a continuation application, claiming priority under § 365(c), of an International application No. PCT/KR2022/002504, filed on Feb. 21, 2022, which is based on and claims the benefit of a Korean patent application number 10-2021-0029562, filed on Mar. 5, 2021, in the Korean Intellectual Property Office, the disclosure of which is incorporated by reference herein in its entirety.

TECHNICAL FIELD

The disclosure relates to an electronic device that is capable of performing device connection based on a user voice. More particularly, the disclosure relates to a device connection method of the electronic device.

BACKGROUND ART

With the development of digital technologies, various types of electronic devices, such as a personal digital assistant (PDA), a smartphone, a tablet personal computer (tablet PC), an artificial intelligent (AI) speaker, a wearable device, a digital camera, and/or Internet of things (IoT) device, are widely used. Further, hardware parts and/or software parts of an electronic device have been continuously developed in order to support and increase the functions of the electronic device.

An electronic device may implement various functions beyond a call function, and may provide various input interfaces to enable a user to use various functions. For example, the input interface of the electronic device may provide a voice input scheme in addition to a button input scheme or a touch screen-based touch input scheme. For example, the electronic device may control execution of an application via a user voice command using voice recognition or speech recognition, and/or may perform a function using a web-based service. The voice recognition technology is technology in which an electronic device understands speech that a user (e.g., a person) utters, and converts the voice into code information that the electronic device is capable of handling. For example, the voice recognition technology may include a processing operation of inputting a voice waveform, identifying a word or a word string, and extracting the meaning thereof.

According to the current voice recognition technology, a command of which operation processing is simple may be processed in an electronic device, and a command that the electronic device (e.g., a client) is incapable of processing (e.g., a command of which operation processing is complex and that requires a large amount of resource) may be processed using a server (e.g., an intelligent server). For example, the electronic device may obtain a user command (e.g., an input voice), may transfer the obtained user command to the server, and may enable the server to process the same.

The electronic device may connect to another electronic device so as to share various data of the electronic device. For example, the electronic device may connect to another electronic device based on designated communication technology (e.g., wireless communication technology, such as wireless fidelity (Wi-Fi), Bluetooth, and/or infrared data association (IrDA)), and may share data between the connected electronic devices.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

However, although it is assumed that electronic devices desired to be connected are present in the same network, a user can connect the electronic devices when an electronic device recognizes various information (e.g., Wi-Fi information (e.g., a service set identifier (SSID)), a user equipment (UE) code, a device name, a password, a connection code, and/or a connection method for each communication technology (e.g., enter a menu and perform setting)) related to connection to another electronic device. In addition, although the various information associated with connection between the electronic devices is recognized, the user needs to perform a series of complex operations (or settings) which is inconvenient.

Aspects of the disclosure are to address at least the above-mentioned problems and/or disadvantages and to provide at least the advantages described below. Accordingly, an aspect of the disclosure is to provide a method and an apparatus for supporting device connection of an electronic device based on a user voice.

Another aspect of the disclosure is to provide a method and an apparatus for performing connection between a plurality of electronic devices via a voice command associated with a user utterance.

Another aspect of the disclosure is to provide a method and an apparatus, in which a first electronic device produces and shares a string and connection information, and a second electronic device performs device connection based on a received user utterance that corresponds to the string produced by the first electronic device and the connection information of the first electronic device.

Additional aspects will be set forth in part in the description which follows and, in part, will be apparent from the description, or may be learned by practice of the presented embodiments.

Solution to Problem

In accordance with an aspect of the disclosure, an electronic device for supporting device connection based on voice recognition is provided. The electronic device includes a communication module, an output module, a memory, and at least one processor operatively connected to the communication module, the output module, and the memory, and the at least one processor is configured to detect initiation of device connection based on a designated user input, to produce a string and connection information for connection to another electronic device, to output the string via the output module, to transmit the string and connection information to the outside, and based on reception of a connection request from the other electronic device, to connect the other electronic device.

In accordance with another aspect of the disclosure, an electronic device for supporting device connection based on voice recognition is provided. The electronic device includes a communication module, a microphone, a memory, and at least one processor operatively connected to the communication module, the microphone, and the memory, and the at least one processor is configured to receive a user utterance related to device connection to another electronic device, to obtain a string related to the other electronic device based on the reception of the user utterance, to determine whether the user utterance and the string are identical, and if the user utterance and the string are identical, to perform connection to the other electronic device based on connection information related to the other electronic device.

In accordance with another aspect of the disclosure, an electronic device for supporting device connection based on voice recognition is provided. The electronic device includes a communication module, an input module, an output module, a memory, and at least one processor, and the at least one processor is configured to determine an operation mode of an electronic device based on a user input, to produce, based on determining of a first operation, a string and connection information for device connection to another electronic device, to transmit the string and connection information to the outside, to await reception of a connection request from the other electronic device based on the connection information, and to perform connection to the other electronic device based on reception of the connection request, and based on determining of a second operation, to receive a user utterance, to obtain a string and connection information related to device connection to another electronic device, and to perform connection to the other electronic device based on the connection information if the user utterance and the string are identical.

In accordance with another aspect of the disclosure, an operation method of an electronic device is provided. The operation method include an operation of determining an operation mode of an electronic device based on a user input, an operation of producing, based on determining of a first operation, a string and connection information for device connection to another electronic device, an operation of transmitting the string and connection information to the outside, an operation of awaiting reception of a connection request from the other electronic device based on the connection information, and an operation of performing connection to the other electronic device based on reception of the connection request, and based on determining of a second operation, an operation of receiving a user utterance, obtaining a string and connection information related to device connection to another electronic device, and an operation of performing connection to the other electronic device based on the connection information if the user utterance and the string are identical.

To address the above-described issues, various embodiments of the disclosure includes a computer-readable recording medium that stores a program for implementing the method in a processor.

Advantageous Effects of Invention

An electronic device and an operation method thereof according to embodiments of the disclosure, connection between devices is supported based on a voice, and in the process in which a user connects devices, the user is capable of connecting desired devices easily and quickly via a user utterance command, without performing a series of complex setting processes which used to be performed.

According to an embodiment of the disclosure, a user can easily and quickly connect electronic device using a user utterance, without knowing well various information (e.g., Wi-Fi information (e.g., a service set identifier (SSID)), a user equipment (UE) code, a device name, a password, a connection code, and/or a connection method for each communication technology (e.g., entering a menu and performing setting)) related to device connection between electronic devices. Through the above, increased convenience, accessibility, and/or service usage satisfaction associated with device connection using an electronic device is provided to a user.

In addition, various effects directly or indirectly recognized from the disclosure can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 13 is a diagram illustrating an operation of providing device connection of an electronic device according to an embodiment of the disclosure.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
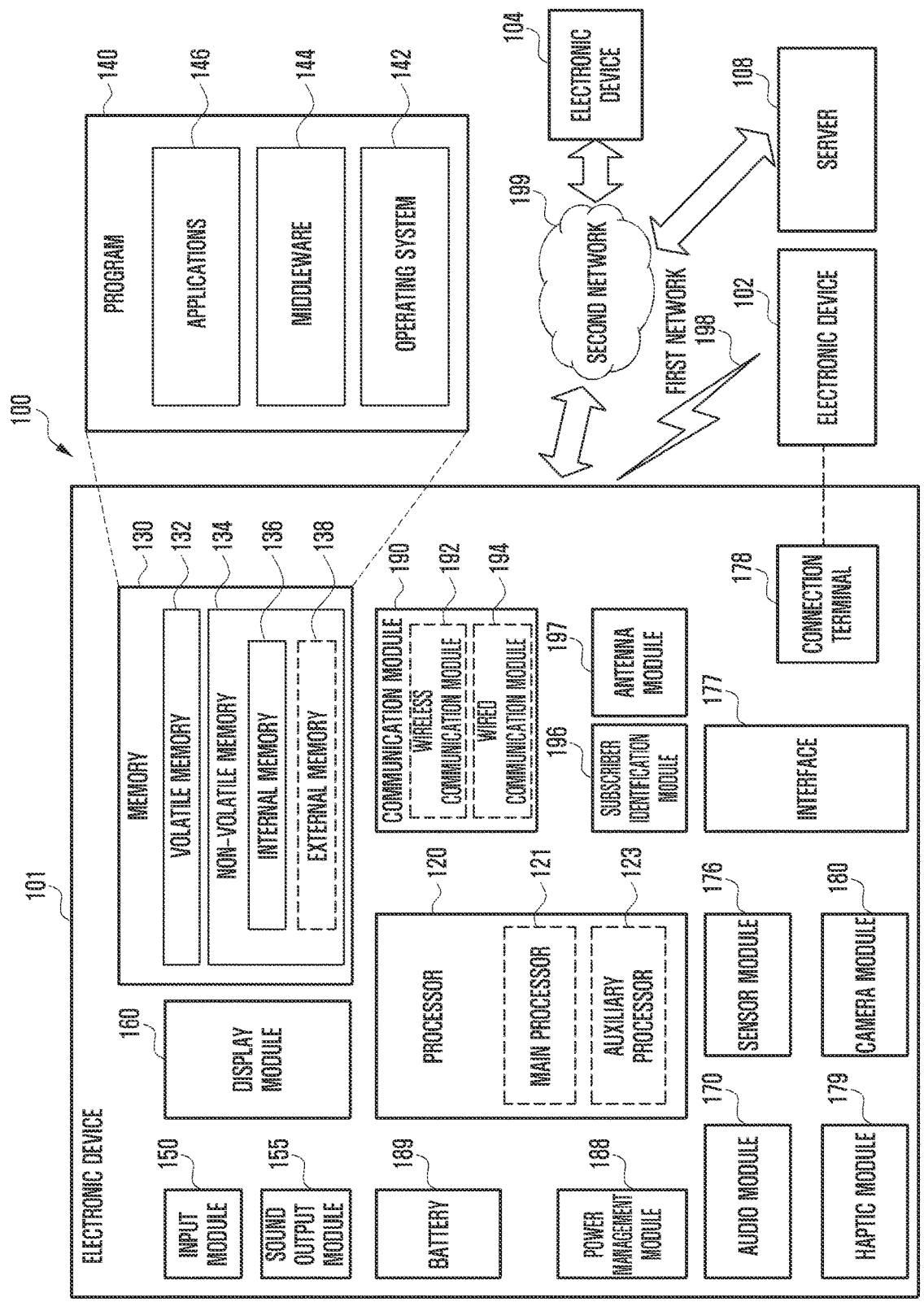
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments of the disclosure, at least one of the components (e.g., the connecting terminal 178) may be omitted from the electronic device 101, or one or more other components may be added in the electronic device 101. In various embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
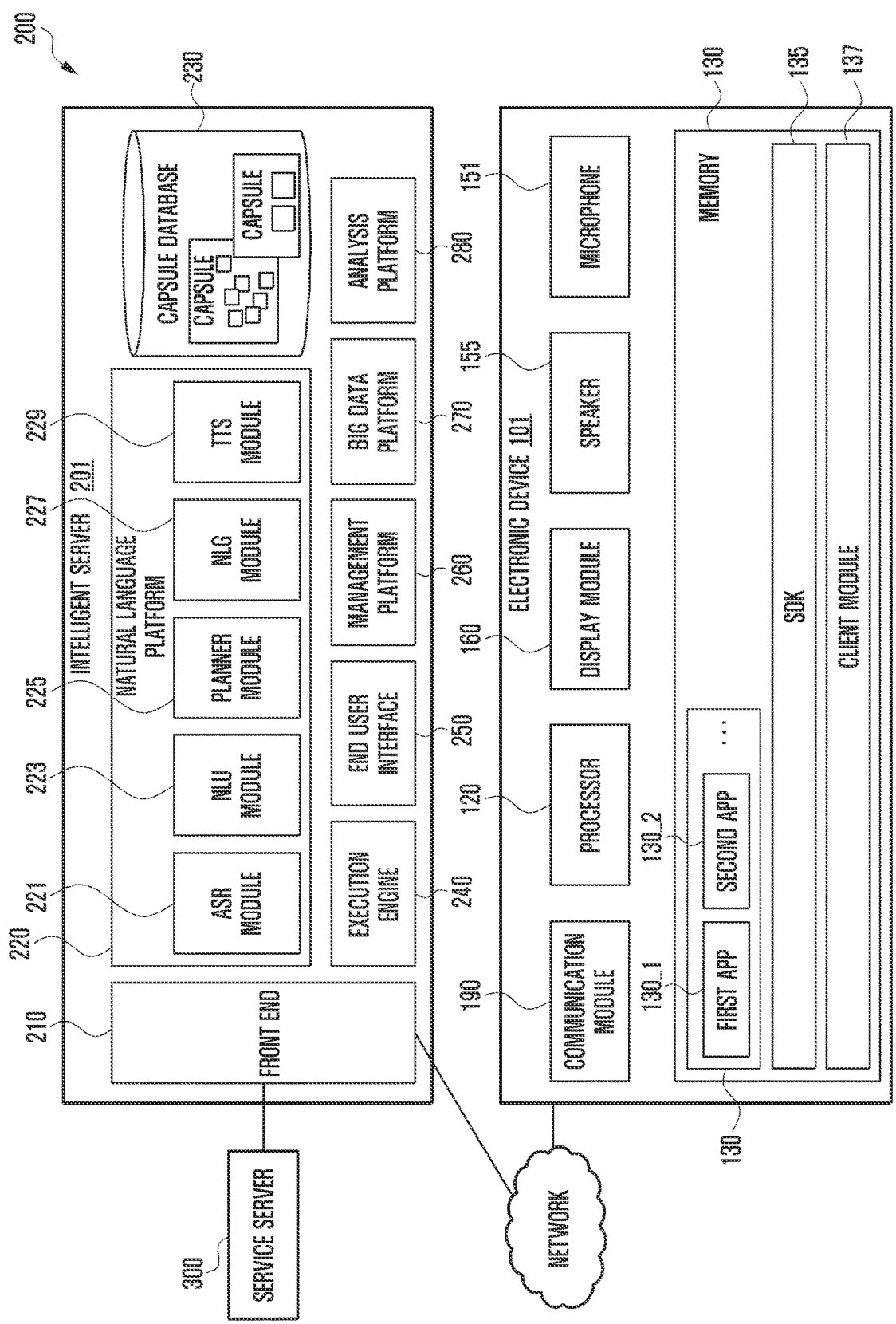
FIG. 2 is a block diagram illustrating an integrated intelligence system according to an embodiment of the disclosure.

FIG. 2 is a block diagram illustrating an integrated intelligence system according to an embodiment of the disclosure.

Referring to FIG. 2, an integrated intelligence system 200 according to the embodiment may include an electronic device 101, an intelligent server 201, and/or a service server 300.

The electronic device 101 of an embodiment may be a terminal device (or electronic device) that can be connected to the Internet, for example, a mobile phone, a smartphone, a personal digital assistant (PDA), a notebook computer, a TV, a domestic appliance, a wearable device, a head-mounted display (HMD), or a smart speaker.

According to the illustrated embodiment of the disclosure, the electronic device 101 may include a communication module (e.g., including communication circuitry) 190 (e.g., the wireless communication module 192 of FIG. 1), a microphone 151 (e.g., the input module 150 of FIG. 1), a speaker 155 (e.g., the sound output module 155 of FIG. 1), a display module 160, a memory 130, and/or a processor (e.g., including communication circuitry) 120. The listed components may be operatively or electrically connected to each other.

The communication module 190 according to an embodiment may include various communication circuitry and may be configured to be connected to an external device to transmit and receive data. The microphone 151 according to an embodiment may receive a sound (e.g., a user utterance) and may convert the sound into an electrical signal. The speaker 155 according to an embodiment may output an electrical signal as a sound (e.g., a voice). The display module 160 according to an embodiment may be configured to display an image or a video. Further, the display module 160 according to an embodiment may display a graphic user interface (GUI) of an executed application (or application program).

The memory 130 according to an embodiment may store a client module 137, a software development kit (SDK) 135, and a plurality of applications 133. The client module 137 and the SDK 135 may form a framework (or a solution program) for performing a general-purpose function. In addition, the client module 137 or the SDK 135 may form a framework for processing a voice input.

The plurality of applications 133 stored in the memory 130 according to an embodiment may be programs for performing a designated function. According to an embodiment of the disclosure, the plurality of applications 133 may include a first application 130_1 and a second application 130_2. According to an embodiment of the disclosure, each of the plurality of applications 133 may include a plurality of operations for performing a designated function. For example, the applications 133 may include an alarm application, a message application, and/or a schedule application. According to an embodiment of the disclosure, the plurality of applications 133 may be executed by the processor 120 to sequentially execute at least some of the plurality of operations.

The processor 120 according to an embodiment of the disclosure may include various processing circuitry and control the overall operation of the electronic device 101. For example, the processor 120 may be operatively or electrically connected to the communication module 190, the microphone 151, the speaker 155, and the display module 160 to perform a designated operation.

The processor 120 according to an embodiment of the disclosure may execute a program stored in the memory 130 to perform a designated function. For example, the processor 120 may execute at least one of the client module 137 or the SDK 135 to perform the following operation for processing a voice input. The processor 120 may control the operation of the plurality of applications 133, for example, through the SDK 135. An operation to be described below as the operation of the client module 137 or the SDK 135 may be an operation executed by the processor 120.

The client module 137 according to an embodiment of the disclosure may receive a voice input. For example, the client module 137 may receive a voice signal corresponding to a user utterance detected through the microphone 151. The client module 137 may transmit the received voice input to the intelligent server 201. The client module 137 may transmit state information about the electronic device 101, together with the received voice input, to the intelligent server 201. The state information may be, for example, execution state information about an application.

The client module 137 according to an embodiment of the disclosure may receive a result corresponding to the received voice input from the intelligent server 201. For example, when the intelligent server 201 can produce the result corresponding to the received voice input, the client module 137 may receive the result corresponding to the received voice input from the intelligent server 201. The client module 137 may display the result received from the intelligent server 201 on the display module 160.

The client module 137 according to an embodiment may receive a plan corresponding to the received voice input from the intelligent server 201. The client module 137 may display a result of executing a plurality of operations of at least one application according to the plan on the display module 160. For example, the client module 137 may sequentially display results of executing the plurality of operations on the display module 160. In another example, the client module 137 may display only some (e.g., a result of executing the last operation) of the results of executing the plurality of operations on the display module 160.

According to an embodiment of the disclosure, the client module 137 may receive a request for obtaining information required to produce the result corresponding to the voice input from the intelligent server 201. According to an embodiment of the disclosure, the client module 137 may transmit the required information to the intelligent server 201 in response to the request.

The client module 137 according to an embodiment of the disclosure may transmit information about the result of executing the plurality of operations according to the plan to the intelligent server 201. The intelligent server 201 may identify that the received voice input has been properly processed using the information about the result.

The client module 137 according to an embodiment may include a speech recognition module. According to an embodiment of the disclosure, the client module 137 may recognize a voice input for performing a limited function through the speech recognition module. For example, the client module 137 may perform an intelligent application for processing a voice input through a designated input (e.g., Wake up!).

The intelligent server 201 according to an embodiment may receive information relating to a user voice input from the electronic device 101 through a communication network. According to an embodiment of the disclosure, the intelligent server 201 may change data relating to the received voice input into text data. According to an embodiment of the disclosure, the intelligent server 201 may generate, based on the text data, a plan for performing a task corresponding to the user voice input.

According to an embodiment of the disclosure, the plan may be generated by an artificial intelligence (AI) system. The artificial intelligence system may include a rule-based system or a neural network-based system (e.g., a feedforward neural network (FNN)), or a recurrent neural network (RNN). The artificial intelligence system may be a combination of the above systems or a different artificial intelligence system. According to an embodiment of the disclosure, the plan may be selected from a set of predefined plans, or may be generated in real time in response to a user request. For example, the artificial intelligence system may select at least one plan from among a plurality of predefined plans.

The intelligent server 201 according to an embodiment of the disclosure may transmit a result according to the generated plan to the electronic device 101 or may transmit the generated plan to the electronic device 101. According to an embodiment of the disclosure, the electronic device 101 may display the result according to the plan on the display module 160. According to an embodiment of the disclosure, the electronic device 101 may display a result of executing an operation according to the plan on the display module 160.

The intelligent server 201 according to an embodiment may include a front end 210, a natural language platform 220, a capsule DB 230, an execution engine 240, an end user interface 250, a management platform 260, a big data platform 270, and/or an analytic platform 280.

The front end 210 according to an embodiment may receive a voice input received from the electronic device 101. The front end 210 may transmit a response corresponding to the voice input to the electronic device 101.

According to an embodiment of the disclosure, the natural language platform 220 may include an automatic speech recognition module (ASR module) 221, a natural language understanding module (NLU module) 223, a planner module 225, a natural language generator module (NLG module) 227, and/or a text-to-speech (TTS) module 229, each of which may include various processing circuitry and/or executable program instructions.

The ASR module 221 according to an embodiment may convert a voice input received from the electronic device 101 into text data. The NLU module 223 according to an embodiment may understand a user's intent using the text data of the voice input. For example, the NLU module 223 may understand the user's intent by performing a syntactic analysis and/or a semantic analysis. The NLU module 223 according to an embodiment may understand the meaning of a word extracted from the voice input using a linguistic feature (e.g., a syntactic element) of a morpheme or phrase and may determine the user's intent by matching the understood meaning of the word to intent.

The planner module 225 according to an embodiment may generate a plan using the intent determined by the NLU module 223 and a parameter. According to an embodiment of the disclosure, the planner module 225 may determine a plurality of domains necessary to perform a task based on the determined intent. The planner module 225 may determine a plurality of operations respectively included in the plurality of domains determined based on the intent. According to an embodiment of the disclosure, the planner module 225 may determine a parameter required to execute the plurality of determined operations or a result value output by executing the plurality of operations. The parameter and the result value may be defined as a concept in a designated format (or class). Accordingly, the plan may include the plurality of operations determined by the intent of the user and a plurality of concepts.

The planner module 225 according to an embodiment may determine a relationship between the plurality of operations and the plurality of concepts by stages (or hierarchically). For example, the planner module 225 may determine the execution order of the plurality of operations, determined based on the user's intent, based on the plurality of concepts. For example, the planner module 225 may determine the execution order of the plurality of operations, based on the parameter required to execute the plurality of operations and the result output by executing the plurality of operations. Accordingly, the planner module 225 may generate a plan including association information (e.g., ontology) between the plurality of operations and the plurality of concepts. The planner module 225 may generate a plan using information stored in a capsule database 230 in which a set of relationships between concepts and operations is stored.

The NLG module 227 according to an embodiment may change designated information into a text form. The information changed into the text form may be in the form of a natural language utterance. The TTS module 229 according to an embodiment may change information in the text form into information in a voice form.

According to an embodiment of the disclosure, some or all functions of the natural language platform 220 may also be implemented in the electronic device 101.

The capsule database 230 according to an embodiment may store information about a relationship between a plurality of concepts and a plurality of operations corresponding to a plurality of domains. A capsule according to an embodiment may include a plurality of action objects (or pieces of action information) and a plurality of concept objects (or pieces concept information) included in a plan. According to an embodiment of the disclosure, the capsule database 230 may store a plurality of capsules in the form of a concept action network (CAN). According to an embodiment of the disclosure, the plurality of capsules may be stored in a function registry included in the capsule database 230.

According to an embodiment of the disclosure, the capsule database 230 may include a strategy registry that stores strategy information required to determine a plan corresponding to a voice input. The strategy information may include reference information for determining one plan when there is a plurality of plans corresponding to the voice input. According to an embodiment of the disclosure, the capsule database 230 may include a follow-up registry that stores information about a follow-up action for suggesting a follow-up action to the user in a specified situation. The follow-up may include, for example, a following utterance. According to an embodiment of the disclosure, the capsule database 230 may include a layout registry that stores layout information about information output through the electronic device 101.

According to an embodiment of the disclosure, the capsule database 230 may include a vocabulary registry that stores vocabulary information included in capsule information. According to an embodiment of the disclosure, the capsule database 230 may include a dialog registry that stores information about a dialog (or interaction) with the user. The capsule database 230 may update a stored object through a developer tool. The developer tool may include, for example, a function editor for updating an action object or a concept object. The developer tool may include a vocabulary editor for updating vocabulary.

The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition. In an embodiment of the disclosure, the capsule database 230 can also be implemented in the electronic device 101.

The execution engine 240 according to an embodiment may produce a result using the generated plan. The end user interface 250 according to an embodiment may transmit the produced result to the electronic device 101. Accordingly, the electronic device 101 may receive the result and may provide the received result to the user. The management platform 260 according to an embodiment may manage information used in the intelligent server 201. The big data platform 270 according to an embodiment may collect user data. The analytic platform 280 according to an embodiment may manage the quality of service (QoS) of the intelligent server 201. For example, the analytic platform 280 may manage a component and the processing speed (or efficiency) of the intelligent server 201.

The service server 300 according to an embodiment may provide a designated service (e.g., a food delivery service or a hotel reservation service) to the electronic device 101. According to an embodiment of the disclosure, the service server 300 may be a server operated by a third party. The service server 300 according to an embodiment may provide information for generating a plan corresponding to a received voice input to the intelligent server 201. The provided information may be stored in the capsule database 230. In addition, the service server 300 may provide result information according to the plan to the intelligent server 201.

In the foregoing integrated intelligent system 200, the electronic device 101 may provide various intelligent services to the user in response to a user input. The user input may include, for example, an input through a physical button, a touch input, or a voice input.

In an embodiment of the disclosure, the electronic device 101 may provide a voice recognition service through an intelligent application (or voice recognition application) stored therein. In this case, for example, the electronic device 101 may recognize a user utterance or a voice input received through the microphone 151 and may provide a service corresponding to the recognized voice input to the user.

In an embodiment of the disclosure, the electronic device 101 may perform a designated operation alone or together with the intelligent server 201 and/or the service server 300, based on the received voice input. For example, the electronic device 101 may execute an application corresponding to the received voice input and may perform the designated operation through the executed application.

In an embodiment of the disclosure, when the electronic device 101 provides a service together with the intelligent server 201 and/or the service server 300, the electronic device 101 may detect a user utterance using the microphone 151 and may generate a signal (or voice data) corresponding to the detected user utterance. The electronic device 101 may transmit the voice data to the intelligent server 201 using the communication module 190.

The intelligent server 201 according to an embodiment of the disclosure may generate, as a voice input received from the electronic device 101, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

The electronic device 101 according to an embodiment may receive the response using the communication module 190. The electronic device 101 may output an audio signal generated inside the electronic device 101 to the outside using the speaker 155 or may output an image generated inside the electronic device 101 to the outside using the display module 160.

Although FIG. 2 illustrates an example in which speech recognition of a voice input received from the electronic device 101, natural language understanding and generation, and production of a result using a plan are performed in the intelligent server 201, various embodiments of the disclosure are not limited thereto. For example, at least some components (e.g., the natural language platform 220, the execution engine 240, and the capsule database 230) of the intelligent server 201 may be embedded in the electronic device 101, and operations thereof may be performed by the electronic device 101.

Figure 3:
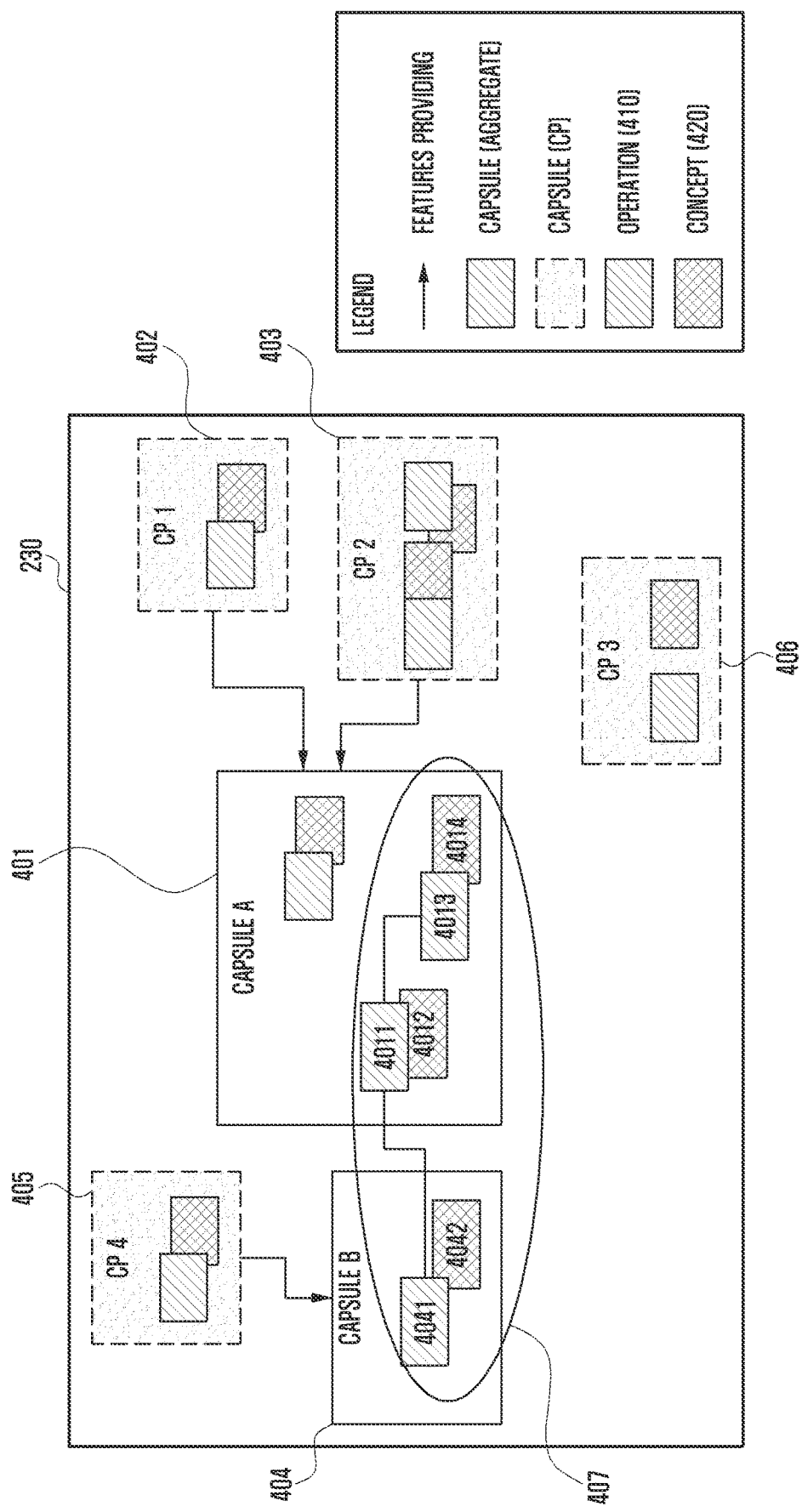
FIG. 3 is a diagram illustrating information about a relationship between a concept and an action is stored in a database according to an embodiment of the disclosure.

FIG. 3 is a diagram illustrating information about a relationship between a concept and an action is stored in a database according to an embodiment of the disclosure.

Referring to FIG. 3, a capsule database 230 of an intelligent server 201 may store a capsule in the form of a concept action network (CAN). The capsule database 230 may store an operation of processing a task corresponding to a voice input from a user and a parameter required for the operation in the form of a CAN.

The capsule database 230 may store a plurality of capsules (e.g., capsule A 401 and capsule B 404) respectively corresponding to a plurality of domains (e.g., applications). According to an embodiment of the disclosure, one capsule (e.g., capsule A 401) may correspond to one domain (e.g., location (geo) or application). Further, one capsule may correspond to at least one service provider (e.g., CP 1 401, CP 2 403, CP 3 406, or CP 4 405) for performing a function for a domain related to the capsule. According to an embodiment of the disclosure, one capsule may include at least one operation 410 and at least one concept 420 for performing a specified function.

A natural language platform 220 may generate a plan for performing a task corresponding to a received voice input using a capsule stored in the capsule database 230. For example, a planner module 225 of the natural language platform 220 may generate the plan using the capsule stored in the capsule database 230. For example, an plan 407 may be generated using operations 4011 and 4013 and concepts 4012 and 4014 of capsule A 401 and an operation 4041 and a concept 4042 of capsule B 404.

Figure 4:
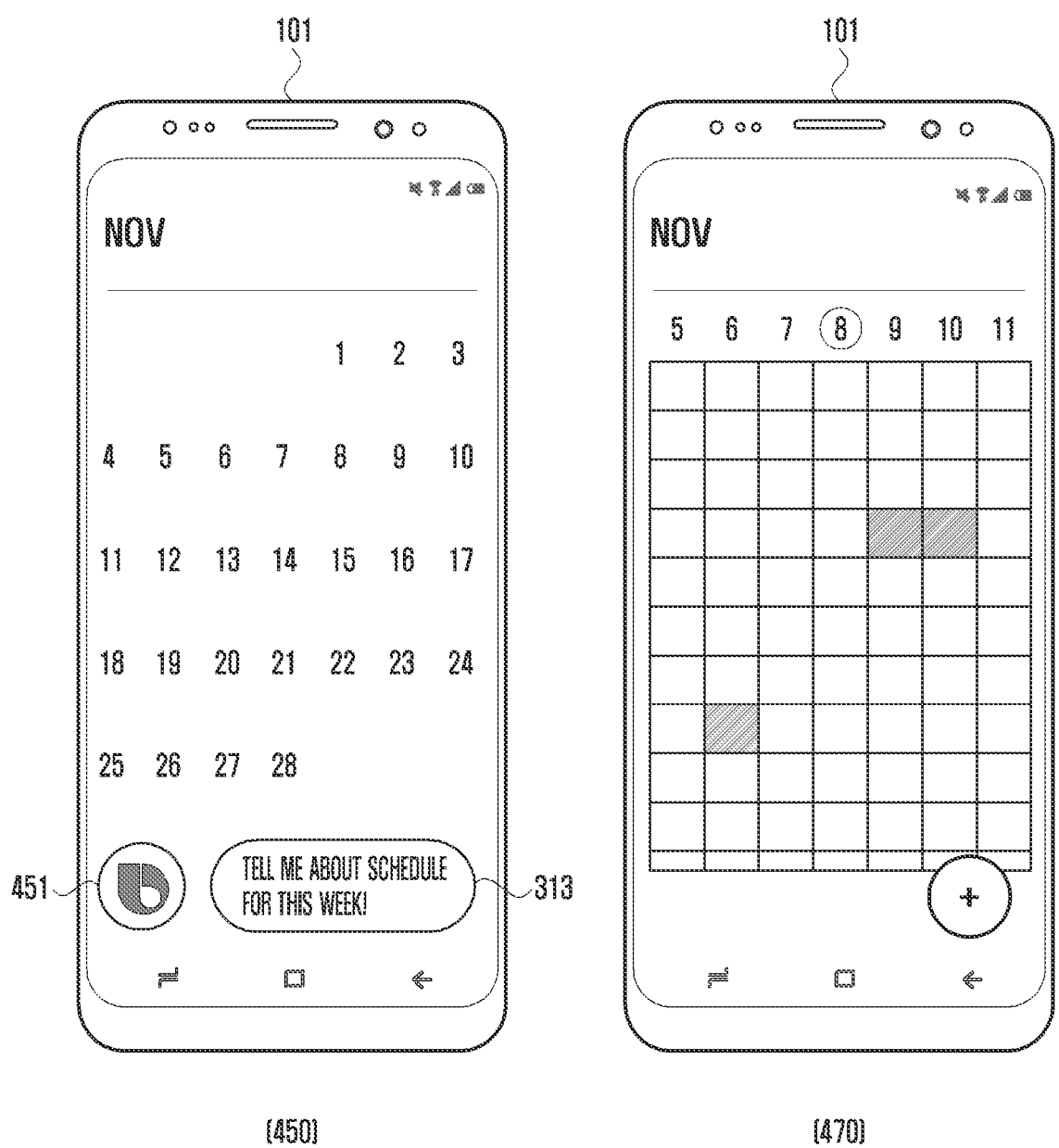
FIG. 4 is a diagram illustrating a user interface for an electronic device to process a received voice input through an intelligent application according to an embodiment of the disclosure.

FIG. 4 is a diagram illustrating a user interface for an electronic device to process a received voice input through an intelligent application according to an embodiment of the disclosure.

Referring to FIG. 4, according to an embodiment of the disclosure, an electronic device 101 may execute an intelligent application to process a user command (e.g., a voice input) through an intelligent server 201.

According to an embodiment of the disclosure, when recognizing a designated voice input (e.g., Wake up!) or receiving an input via a hardware key (e.g., a dedicated hardware key), the electronic device 101 may execute the intelligent application for processing the voice input in a first user interface 450. For example, the electronic device 101 may execute the intelligent application in a state in which a schedule application is executed. According to an embodiment of the disclosure, the electronic device 101 may display an object 451 (e.g., an icon) corresponding to the intelligent application on a display module 160. According to an embodiment of the disclosure, the electronic device 101 may receive a voice input based on a user utterance. For example, the electronic device 101 may receive a voice input "Tell me the schedule for this week!" According to an embodiment of the disclosure, the electronic device 101 may display a user interface (UI, e.g., an input window) 313 of the intelligent application displaying text data of the received voice input on the display module 160.

According to an embodiment of the disclosure, the electronic device 101 may display a result corresponding to the received voice input in a second user interface 470 on the display module 160. For example, the electronic device 101 may receive a plan corresponding to the received user command (e.g., the received voice input) and may display "Schedule for this week" according to the plan on the display module 160.

Figure 5:
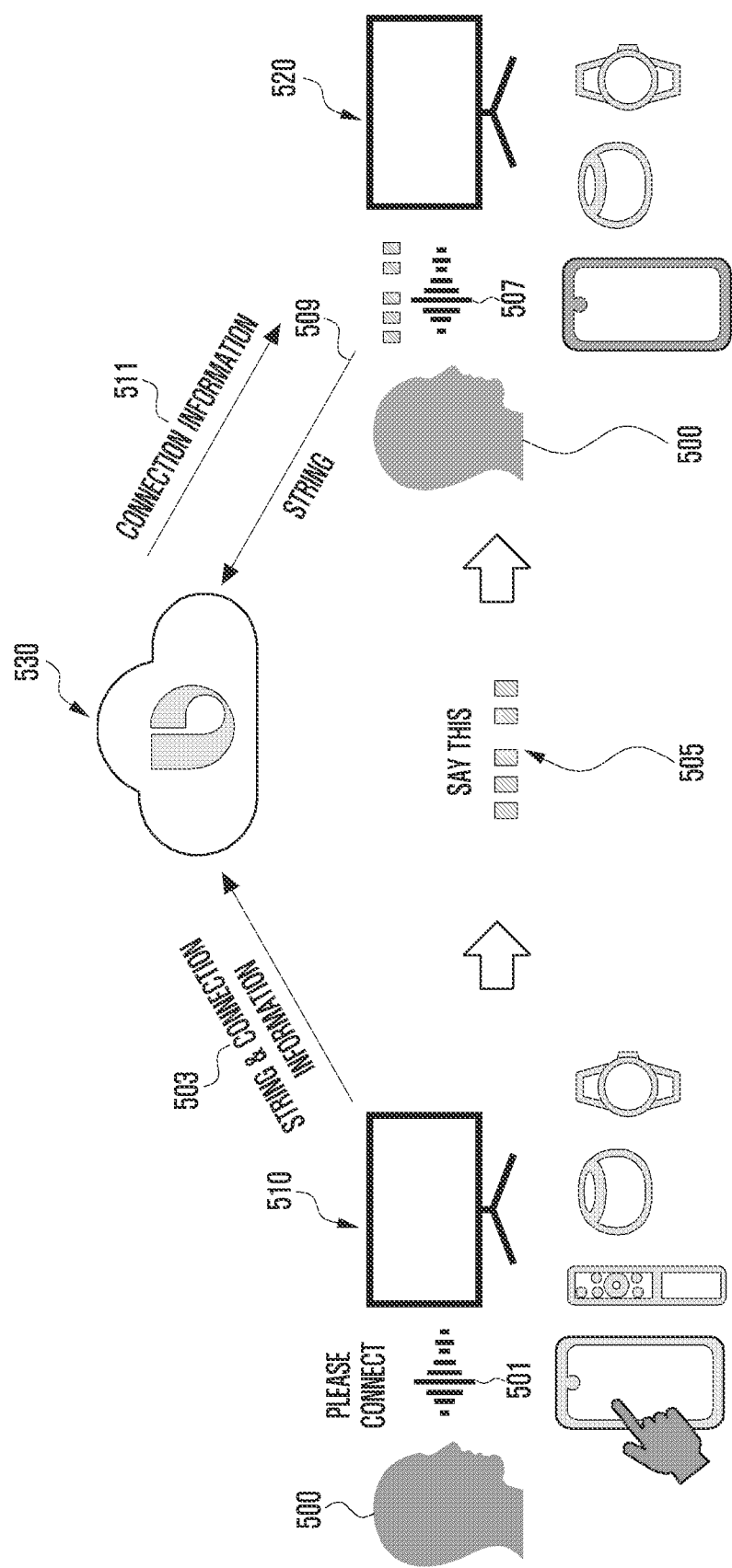
FIG. 5 is a diagram illustrating an operation of performing device connection of an electronic device according to an embodiment of the disclosure.

FIG. 5 is a diagram illustrating an operation of performing device connection of an electronic device according to an embodiment of the disclosure.

Referring to FIG. 5, according to an embodiment of the disclosure, an operation of performing device connection between a first electronic device 510 and a second electronic device 520, using a voice of a user 500 is illustrated. According to various embodiment of the disclosure, the first electronic device 510 and the second electronic device 520 may be distinguished depending on an operation (or an operation mode) that performs device connection. According to an embodiment of the disclosure, in FIG. 5, the electronic device 101 that initiates a device connection operation is referred to as the first electronic device 510, and the electronic device 101 that performs device connection with a device desired to be connected (e.g., the first electronic device 510) is referred to as a second electronic device 520.

According to an embodiment of the disclosure, the electronic device 101 may include various types of electronic devices, such as a personal digital assistant (PDA), a smartphone, a tablet personal computer (tablet PC), a laptop PC, a smart speaker (e.g., an artificial intelligent (AI) speaker), a wearable device, a display device (e.g., a television (TV), a monitor), a digital camera, a remote control device, a head mounted display (HMD), and/or Internet of things (IoT), and the like. According to an embodiment of the disclosure, the electronic device 101 may include all or some of the elements illustrated in FIG. 1.

Referring to FIG. 5, according to an embodiment of the disclosure, in the case of device connection between the first electronic device 510 and the second electronic device 520, the user 500 may command the first electronic device 510 to initiate a device connection operation based on a designated input method among various input methods (e.g., a voice, a button, a touch, or a gesture) for initiating a device connection operation in the first electronic device 510.

According to an embodiment of the disclosure, in operation 501, the user 500 may utter a designated command for initiating a device connection operation, such as, "Please connect". According to an embodiment of the disclosure, the designated command may be produced by a button input (e.g., a hardware button) configured to produce a designated command in the first electronic device 510, a screen touch input, a gesture (or motion) control input associated with the first electronic device 510, and/or a control signal input using a remote control device, in addition to a voice.

For example, based on the type of the first electronic device 510 (e.g., whether a microphone and/or a display module is present), the user 500 may perform user input for initiating a device connection operation performed by the first electronic device 510 using an element designated for initiating the device connection operation. According to an embodiment of the disclosure, the first electronic device 510 may determine triggering of a device connection operation based on detecting, from the user 500, the designated command that is based on the user input.

According to an embodiment of the disclosure, based on the determination of triggering of the device connection operation (e.g., initiating a device connection operation), the first electronic device 510 may produce a string related to connection to the second electronic device 520. According to an embodiment of the disclosure, the first electronic device 510 may receive a user utterance from the user 500, and may produce a string corresponding to the user utterance. According to another embodiment of the disclosure, the first electronic device 510 may produce a string by selecting one of at least one string stored in advance in the memory 130. According to another embodiment of the disclosure, the first electronic device 510 may produce a string by obtaining (requesting and receiving) the string from a server 530 (e.g., the intelligent server 201 of FIG. 2 or a string server).

According to an embodiment of the disclosure, the first electronic device 510 may produce connection information of the first electronic device 510. According to an embodiment of the disclosure, the connection information may be produced based on a communication module (e.g., a Bluetooth module and/or Wi-Fi module) of the first electronic device 510 and the set state (e.g., activated/deactivated state) of the communication module. For example, the first electronic device 510 may determine the type of device-to-device connection method available for the first electronic device 510, and may produce connection information corresponding to the type of connection method.

According to an embodiment of the disclosure, the connection information may include, based on the type of connection method, a Wi-Fi on/off state, a Bluetooth on/off state, a signal strength, Wi-Fi connection state information (e.g., network information or state information associated with whether another electronic device is connected), Bluetooth connection state information, Bluetooth media access control (MAC) address information, Wi-Fi MAC address information, a service set identifier (SSID), a password, a code, and/or model information (e.g., a model name) of a communication module to be connected, and/or the identifier (e.g., a device identifier and/or a device name) of the first electronic device 510.

According to an embodiment of the disclosure, the first electronic device 510 may transmit the string and connection information to the server 530 (e.g., the intelligent server 201 of FIG. 2 or a device information server) in operation 503. According to an embodiment of the disclosure, the first electronic device 510 may transmit, to the server 530, the device information (e.g., a device identifier and/or device name) of the first electronic device 510 together with the string and connection information.

According to an embodiment of the disclosure, based on the reception of the string and the connection information from the first electronic device 510, the server 530 may match and store the string and connection information.

According to an embodiment of the disclosure, the first electronic device 510 may perform an operation of outputting the string and information (e.g., guide information) related to the string to the outside parallelly, sequentially, reverse sequentially, or heuristically with an operation of transmitting the string and the connection information to the server 530. According to an embodiment of the disclosure, the first electronic device 510 may output the string and the information related to the string to the outside and may provide the same to the user 500 according to an output scheme (e.g., auditory information (e.g., audio) output and visual information (e.g., text, images, and/or videos) output) designated based on the type of the first electronic device 510 (e.g., whether a speaker and/or a display module is present).

According to an embodiment of the disclosure, the first electronic device 510 may output <Say this. 'open sesame'> in the form of auditory information and/or visual information. According to an embodiment of the disclosure, 'Say this' may be information related to a string (e.g., guide information for providing a device connection method to a user), and 'open sesame' may be a unique string to support device connection of the first electronic device 510. According to an embodiment of the disclosure, the string may be produced variously, such as the string may be produced based on a user utterance or by randomly obtaining the string from the inside (e.g., the memory 130) or outside (e.g., the server 530).

According to an embodiment of the disclosure, the user 500 may input a user utterance to the second electronic device 520 in operation 507. According to an embodiment of the disclosure, the user 500 may identify the string (e.g., open sesame) output from the first electronic device 510, and may provide an utterance corresponding to the identified string (e.g., open sesame). According to an embodiment of the disclosure, the user 500 may wake up the second electronic device 520 based on a designated user input (e.g., a designated button for wake-up and/or a designated voice command input) for initiating voice recognition in the second electronic device 520, and may provide an utterance associated with the string produced by the first electronic device 510.

According to an embodiment of the disclosure, based on the reception of the user utterance, the second electronic device 520 may transmit a string (e.g., text) associated with the received user utterance to the server 530 (e.g., the intelligent server 201 of FIG. 2) in operation 509. According to an embodiment of the disclosure, based on the reception of the user utterance after wake-up, the second electronic device 520 may analyze (or verify) the user utterance, and if the user utterance is related to device connection, the second electronic device 520 may request, from the server 530, provision of the string (text) associated with the user utterance and connection information that matches the string. According to an embodiment of the disclosure, the second electronic device 520 may transmit, to the server 530, the device information (e.g., a device identifier and/or device name) of the second electronic device 520 together with the string.

According to an embodiment of the disclosure, the server 530 may receive the string from the second electronic device 520, and may determine whether the received string and a string stored (or reserved) are identical via matching. For example, the server 530 may compare a first string produced and received from the first electronic device 510 and a second string produced and received from the second electronic device 520, and may determine whether the first string and the second string are identical. According to an embodiment of the disclosure, if the first string and the second string are identical, the server 530 may transmit connection information that matches the first string to the second electronic device 520 in operation 511.

According to an embodiment of the disclosure, the second electronic deice 520 may receive the connection information from the server 530, and may connect to the first electronic device 510 based on the received connection information. According to an embodiment of the disclosure, based on the connection information of the first electronic device 510, the second electronic device 520 may switch (or change) the second electronic device 520 to the state of being connectable to the first electronic device 510, and subsequently, may start connection to the first electronic device 510 based on the connection information.

According to an embodiment of the disclosure, the second electronic device 520 may determine an optimal connection method based on the connection information of the first electronic device 510, may change the device state of the second electronic device 520 (e.g., activate a corresponding communication module) based on the determined connection method, and may perform connection to the first electronic device 510 based on the connection information.

According to an embodiment of the disclosure, the example of FIG. 5 provides an example of an operation of the server 530 via interoperation in which the server 530 may compare strings (e.g., the first string and the second string) received respectively from the first electronic device 510 and the second electronic device 520 so as to determine whether they are identical, and may provide the result of the determination to the second electronic device 520. Various embodiments are not limited thereto, and if the electronic device 101 (e.g., the second electronic device 520) includes an embedded voice recognition agent (e.g., ASR/NLU), the electronic device 101 may perform processing in an on-device state. According to an embodiment of the disclosure, an example of processing in the on-device state will be described.

According to an embodiment of the disclosure, the first electronic device 510 may be incapable of accessing the Internet, or may be in the state of excluding a Wi-Fi module and being capable of supporting only Bluetooth. In this instance, the first electronic device 510 provides a string stored in advance to a user, and may change an available protocol (e.g., Bluetooth) to an initial state. According to an embodiment of the disclosure, when the second electronic device 520 identifies, via the server 530, a string input by the user, the second electronic device 520 may receive a protocol type connectable to the type of a device that sends the corresponding string and predefined default information associated with the device, and may search for the same so as to perform device connection.

According to an embodiment of the disclosure, the first electronic device 510 and the second electronic device 520 are incapable of accessing the Internet, or may be in the state of excluding a Wi-Fi module and being capable of supporting only Bluetooth. In this instance, the first electronic device 510 may provide a string stored in advance to a user, and may change an available protocol (e.g., Bluetooth) to an initial state.

According to an embodiment of the disclosure, the second electronic device 520 may identify whether a string input by the user is identical to a string stored in the second electronic device 520, may identify a protocol type connectable to the type of a device that sends the corresponding string and predefined default information associated with the device, may search for the same, and may perform device connection. According to an embodiment of the disclosure, if the second electronic device 520 includes an embedded ASR (eASR) module and/or an embedded NLU (eNLU), the second electronic device 520 may convert a sentence uttered by the user into a string in the on-device state without using the server 530.

Figure 6:
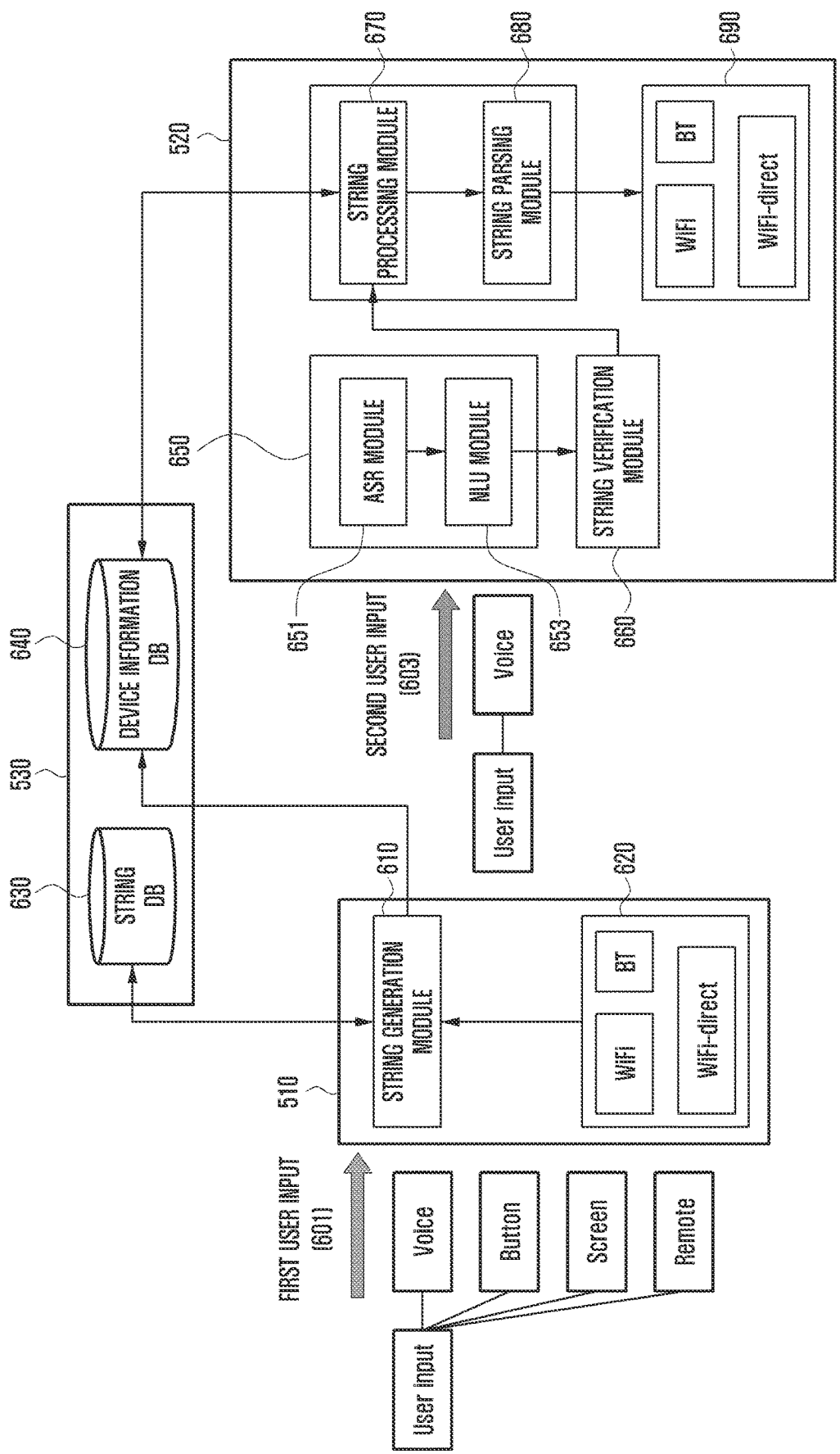
FIG. 6 is a diagram illustrating an operation of providing device connection based on interoperation between an electronic device and a server according to an embodiment of the disclosure.

FIG. 6 is a diagram illustrating an operation of providing device connection based on interoperation between an electronic device and a server according to an embodiment of the disclosure.

Referring to FIG. 6, according to an embodiment of the disclosure, the first electronic device 510 may provide, to the server 530 (e.g., the intelligent server 201 of FIG. 2), a first string produced in association with a user utterance and connection information of the first electronic device 510. According to an embodiment of the disclosure, the second electronic device 520 may provide, to the server 530, a second string produced in association with a user utterance and a request for connection information that matches the second string.

According to an embodiment of the disclosure, the server 530 may determine whether the first string and the second string are identical, and may provide connection information of the first electronic device 510 to the second electronic device 520 based on whether they are identical. According to an embodiment of the disclosure, the first electronic device 510 and the second electronic device 520 may perform connection based on the connection information. For example, FIG. 6 illustrates an example of supporting device connection between the first electronic device 510 and the second electronic device 520 based on interoperation among the first electronic device 510, the second electronic device 520, and the server 530.

Referring to FIG. 6, according to an embodiment of the disclosure, the first electronic device 510 may receive a first user input 601. According to an embodiment of the disclosure, the first user input 601 may include one of various input methods designated based on the type of the first electronic device 510, such as a voice-based input method, a button-based input method, a screen touch-based input method, and/or a remote control-based input method. According to an embodiment of the disclosure, in FIG. 6, the first user input 601 is illustrated as a voice-based input (e.g., Please connect). According to an embodiment of the disclosure, a user may initiate device connection in the first electronic device 510 via various input methods. According to an embodiment of the disclosure, the first user input 601 associated with a user utterance may be, for example, an utterance having a clear intention to indicate device connection.

According to an embodiment of the disclosure, based on reception of the first user input 601, the first electronic device 510 may produce a string related to the first user input 601 via a string generation module 610. According to an embodiment of the disclosure, when a user inputs an utterance (e.g., the first user input 601) via a voice assistance, the first electronic device 510 may produce a string associated with the user utterance. According to an embodiment of the disclosure, the first electronic device 510 may activate (activation) the string generation module 610 based on detection of the first user input 601, and the string generation module 610 may produce a string (e.g., open sesame) associated with a user utterance.

According to an embodiment of the disclosure, the string generation module 610 may obtain a string from the server 530 (e.g., a string DB 630), or may obtain a string predefined in the memory 130 of the first electronic device 510.

According to an embodiment of the disclosure, the first electronic device 510 may provide the produced string to the user by outputting voice via a speaker (e.g., the speaker 155 of FIG. 2), and/or by displaying on a screen using a display module (e.g., the display module 160 of FIG. 1).

According to an embodiment of the disclosure, the first electronic device 510 (e.g., the string generation module 610) may identify the states of various communication modules 620 (e.g., the communication module 190 of FIG. 1) of the first electronic device 510, and may determine a device-to-device connection method type available for (or configured in) the first electronic device 510. According to an embodiment of the disclosure, the first electronic device 510 may produce connection information of the first electronic device 510 that corresponds to the connection method type. According to an embodiment of the disclosure, the connection information may include, for example, a Wi-Fi on/off state, a Bluetooth on/off state, a signal strength, Bluetooth connection state information, Bluetooth MAC address information, Wi-Fi MAC address information, an SSID, a password, and/or model information.

According to an embodiment of the disclosure, the first electronic device 510 may provide, to the server 530, a string and connection information of the first electronic device 510. According to an embodiment of the disclosure, the string produced by the first electronic device 510 and the connection information of the first electronic device 510 may be stored and managed in a device information DB 640 of the server 530.

According to an embodiment of the disclosure, the server 530 may manage the string and the connection information of the first electronic device 510 by matching them to be connected to each other. According to an embodiment of the disclosure, the first electronic device 510 may provide the string and connection information, and may await a call (or a connection request) from an external electronic device (e.g., the second electronic device 520).

According to an embodiment of the disclosure, the second electronic device 520 may receive a second user input 603. According to an embodiment of the disclosure, the second user input 603 may be input based on a voice. For example, the user may utter a string that is identified via the first electronic device 510, with respect to the second electronic device 520 desired to be connected to the first electronic device 510.

According to an embodiment of the disclosure, if receiving the second user input 603 (e.g., a user utterance corresponding to the string), the second electronic device 520 may convert, using a voice assistant 650, a voice signal (or an audio stream) associated with the user utterance into a string (e.g., a text). For example, the second electronic device 520 may include an automatic speech recognition (ASR) module 651 that converts a user utterance into natural language text and/or a natural language understanding (NLU) module 653 that finds and maps a capsule which is to process a natural language text obtained via conversion.

According to an embodiment of the disclosure, the second electronic device 520 may verify, using a string verification module 660, the user utterance which is converted into the string (e.g., text) via the voice assistant 650 (e.g., ASR module 651 and/or the NLU module 653).

According to an embodiment of the disclosure, the string verification module 660 may determine whether the string associated with the user utterance is a unique string (e.g., open sesame, AZAAC, or good bye don't go) which is not defined in a designated format, such as the string produced by the first electronic device 510. For example, the string verification module 660 may verify a string including a normal command for voice recognition and a unique string for device connection.

According to an embodiment of the disclosure, based on the result of verification by the string verification module 660, if the user utterance associated with the second user input 603 is verified as a unique string, the second electronic device 520 may provide the corresponding string to the server 530 via a string processing module (string handler) 670. According to an embodiment of the disclosure, the string produced by the second electronic device 520 may be provided to the device information DB 640 of the server 530.

According to an embodiment of the disclosure, if receiving a string (hereinafter, referred to as a 'second string') from the second electronic device 520, the server 530 may determine whether a string (hereinafter, referred to as a first string) that currently reserves in the device information DB 640 in the server 530 (e.g., a string produced and received from the first electronic device 510) and the second string are identical via matching. According to an embodiment of the disclosure, if the first string and the second string are identical, the server 530 may provide connection information that matches the first string (connection information received from the first electronic device 510) to the second electronic device 520.

According to an embodiment of the disclosure, for reusing of a string, the server 530 may remove (or delete), from the device information DB 640, strings that are obtained from the first electronic device 510 and the second electronic device 520. According to an embodiment of the disclosure, if device connection between the first electronic device 510 and the second electronic device 520 is performed within a predetermined time, the server 530 may immediately remove a corresponding string from the device information DB 640 at the corresponding point in time.

According to an embodiment of the disclosure, if receiving connection information (e.g., a text or phrase format) related to the first electronic device 510 from the server 530, the second electronic device 520 may interpret the connection information using a string parsing module 680. According to an embodiment of the disclosure, the string parsing module 680 may interpret the text or phase associated with the connection information received from the server 530 according to a designated rule (e.g., a grammatical rule), and may understand the meaning of the connection information.

According to an embodiment of the disclosure, based on the connection information interpreted by the string parsing module 680, the second electronic device 520 may identify a communication module 690 available for connection to the first electronic device 510 among various communication modules 690 (e.g., the communication module 190 of FIG. 1) of the second electronic device 520 and the state of the corresponding communication module 690. According to an embodiment of the disclosure, the second electronic device 520 may determine an optimal connection method based on the connection information of the first electronic device 510, may change the device state of the second electronic device 520 (e.g., activate a corresponding communication module) based on the determined connection method, and may perform connection to the first electronic device 510 based on the connection information.

According to an embodiment of the disclosure, the first electronic device 510, the second electronic device 520, and the server 530 may not be limited to the elements disclosed in FIG. 6, and may be embodied including various modules as illustrated in FIG. 1 or FIG. 2.

According to an embodiment of the disclosure, the example of FIG. 6 provides an example of an operation in which the server 530 compares strings (e.g., a first string and a second string) received respectively from the first electronic device 510 and the second electronic device 520 so as to determine whether they are identical, and provides the result of the determination to the second electronic device 520. Various embodiments are not limited thereto, and the electronic device 101 (e.g., the second electronic device 520) is also capable of performing processing in an on-device state.

According to an embodiment of the disclosure, the second electronic device 520 may operate the voice assistant 650 based on a user's wake-up utterance, and may compare a subsequent user utterance (e.g., the second user input 603) and a string related to the first electronic device 510 that is previously registered in the second electronic device 520. According to an embodiment of the disclosure, if the result of comparison shows that the strings are identical, the second electronic device 520 may obtain connection information related to the string from the server 530. According to an embodiment of the disclosure, based on obtaining of the connection information from the server 530, the second electronic device 520 may identify the connection state of the second electronic device 520, may change the second electronic device 520 to the state of being connectable based on the connection information of the first electronic device 510, and may start connection to the first electronic device 510 based on the connection information.

According to various embodiments of the disclosure, in the case of device connection between the first electronic device 510 and the second electronic device 520, the user may easily and quickly perform connection via a voice without entering a complex menu and/or performing settings. According to an embodiment of the disclosure, the user may automatically perform device connection between the first electronic device 510 and the second electronic device 520, via only an operation of reading a string that is displayed on the screen of the first electronic device 510 (e.g., TV), with respect to the second electronic device 520 (e.g., a smartphone).

Figure 7:
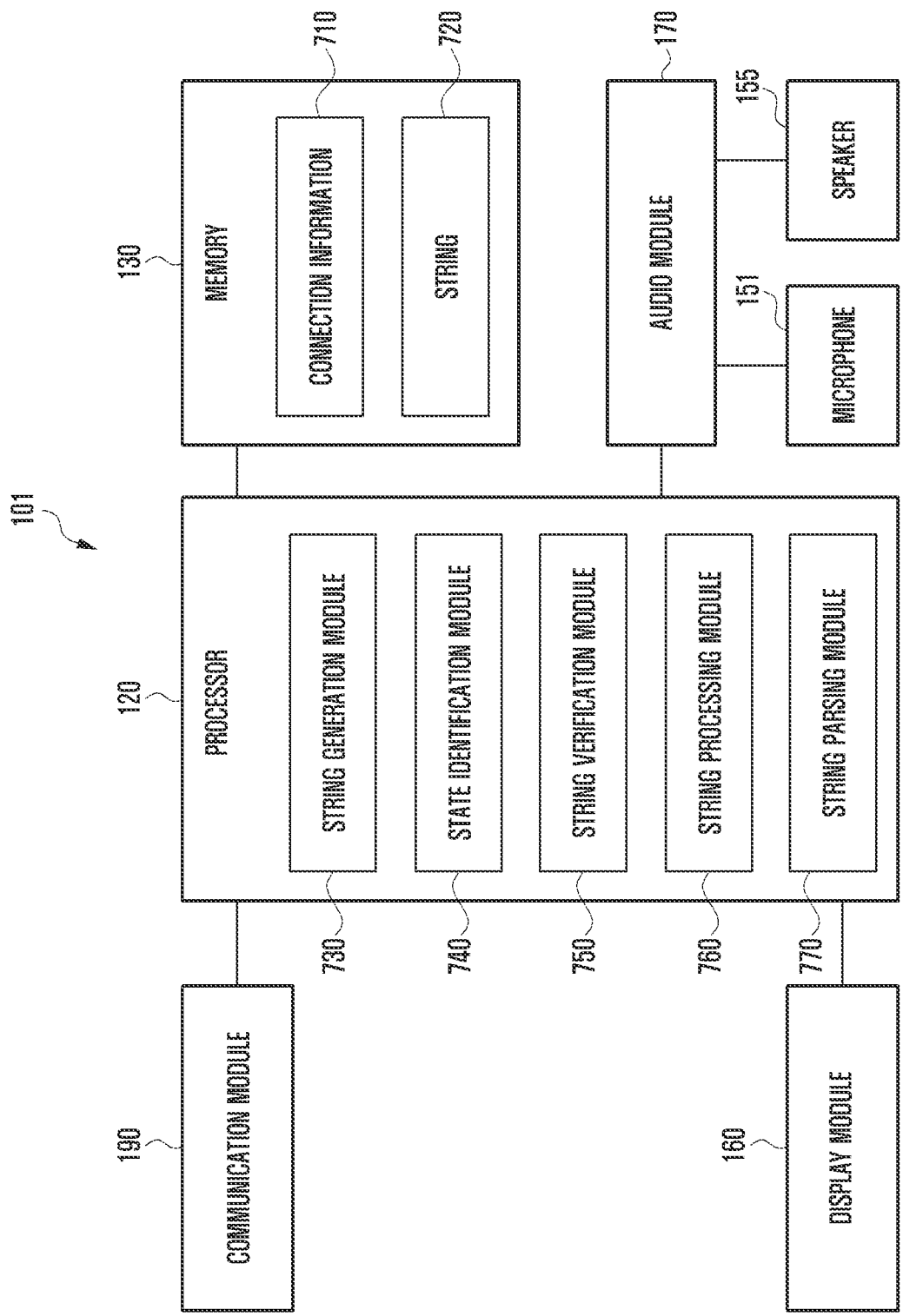
FIG. 7 is a diagram schematically illustrating a configuration of an electronic device according to an embodiment of the disclosure.

FIG. 7 is a diagram schematically illustrating a configuration of an electronic device according to an embodiment of the disclosure.

Referring to FIG. 7, the electronic device 101 according to an embodiment may include the audio module 170, the communication module 190, the display 160, the processor 120, and/or the memory 130.

According to an embodiment of the disclosure, the audio module 170 may correspond to the audio module 170 as described with reference to FIG. 1. According to an embodiment of the disclosure, the audio module 170 may convert a sound into an electric signal, or may convert an electric signal into a sound. According to an embodiment of the disclosure, the audio module 170 may obtain a sound via the microphone 151 (e.g., the input module 150 of FIG. 1), or may output a sound via the speaker 155 (e.g., the sound output module 155 of FIG. 1). The microphone 151 according to an embodiment of the disclosure may receive a sound (e.g., a user utterance), and may convert the sound into an electric signal. The speaker 155 according to an embodiment may output an electric signal as a sound (e.g., a voice).

According to an embodiment of the disclosure, when the electronic device 101 operates as a device that initiates device connection while performing device connection, the microphone 151 may be omitted depending on the type of the electronic device 101. For example, the electronic device 101 may be a smart speaker, a display device (e.g., a TV or monitor), home appliances, and/or an IoT device that does not include the microphone 151. In this instance, in association with obtaining (e.g., producing or receiving) a string for device connection, the electronic device 101 may initiate a device connection operation using another input device (e.g., a button, a touch screen, and/or a remote control device, and/or the input module 150 of FIG. 1).

According to an embodiment of the disclosure, in response to the initiation of the device connection, the electronic device 101 may output an obtained string and information (e.g., guide information) related to the string as a sound (e.g., a voice) via the speaker 155.

According to an embodiment of the disclosure, the communication module 190 may support a legacy network (e.g., a 3G network and/or 4G network), a 5G network, out of band (OOB) and/or next generation communication technology (e.g., new radio NR) technology). According to an embodiment of the disclosure, the communication module 190 may correspond to the wireless communication module 192 as illustrated in FIG. 1. According to an embodiment of the disclosure, the electronic device 101 may perform communication with an external device (e.g., the server 108 of FIG. 1, the intelligent server 201 of FIG. 2, and/or other external electronic devices 102 and 104 of FIG. 1) via a network using the communication module 190. According to an embodiment of the disclosure, when operating an intelligent service, the electronic device 101 may transmit a sound signal of a user utterance input via the microphone 151 to a server (e.g., the server 530 of FIG. 5 or FIG. 6) via the communication module 190, and may receive, from the server, a response result obtained by processing the sound signal of the user utterance.

According to an embodiment of the disclosure, in the case of operating intelligent device connection, when detecting initiation of device connection via a corresponding input module (e.g., the input module 150 of FIG. 1) among various input methods, the electronic device 101 may transmit a string obtained from the inside and/or outside to a server (e.g., the server 530 of FIG. 5 or FIG. 6) via the communication module 190.

According to an embodiment of the disclosure, in the case of operating intelligent device connection, the electronic device 101 may transmit a voice signal (e.g., a string) of a user utterance input via the microphone 151 to a server (e.g., the server 530 of FIG. 5 or FIG. 6) via the communication module 190, and may receive connection information corresponding to the voice signal of the user utterance (e.g., connection information related to an electronic device to which the electronic device 101 is connectable) from the server.

According to an embodiment of the disclosure, the display module 160 may correspond to the display module 160 as described with reference to FIG. 1. According to an embodiment of the disclosure, the display module 160 may visually provide various types of information to the outside of the electronic device 101 (e.g., a user). According to an embodiment of the disclosure, the display module 160 may include a touch sensing circuit (or a touch sensor) (not illustrated), a pressure sensor for measuring the intensity of a touch, and/or a touch panel (e.g., a digitizer) that detects a magnetic field-based stylus pen.

According to an embodiment of the disclosure, the display module 160 may measure, based on a touch sensing circuit, a pressure sensor, and/or a touch panel, a change of a signal (e.g., a voltage, the amount of light, a resistance, an electromagnetic signal, and/or the amount of electric charge) to a predetermined location of the display module 160, so as to detect a touch input and/or a hovering input (or a proximity input). According to an embodiment of the disclosure, the display module 160 may include a liquid crystal display (LCD), an organic light emitted diode (OLED), and an active matrix organic light emitted diode (AMOLED). According to an embodiment of the disclosure, the display module 160 may include a flexible display.

According to an embodiment of the disclosure, according to control performed by the processor 120, the display module 160 may visually provide various information (e.g., a user interface) related to performing intelligent device connection and a response result obtained by processing a user utterance. According to an embodiment of the disclosure, in response to initiation of device connection, the electronic device 101 may display a string and information (e.g., guide information) related to the string via the display module 160.

According to an embodiment of the disclosure, when the electronic device 101 operates as a device that initiates device connection while performing device connection, the display module 160 may be omitted depending on the type of the electronic device 101. For example, the electronic device 101 may be a smart speaker, home appliances, and/or an IoT device that does not include the display module 160. In this instance, regarding output of a string associated with device connection, the electronic device 101 may output a string and information related to the string as sound (e.g., voice) via the speaker 155.

According to an embodiment of the disclosure, the memory 130 may correspond to the memory 130 as described with reference to FIG. 1. According to an embodiment of the disclosure, the memory 130 may store various data used by the electronic device 101. Data may include, for example, input data or output data associated with an application (e.g., the program 140 of FIG. 1) and a related command.

According to an embodiment of the disclosure, the memory 130 may include an application that is capable of being operated by the processor 120, and that is related to operating an intelligent device connection function (or operation). For example, the device connection function may be performed by a device connection application. According to an embodiment of the disclosure, the device connection application may be stored in the memory 130 as software (e.g., the program 140 of FIG. 1), and may be performed by the processor 120. According to an embodiment of the disclosure, the device connection function by the device connection application may be a function that supports an operation of automatically performing device connection of the electronic device 101 (e.g., device connection between the first electronic device 510 and the second electronic device 520) based on a user utterance in the electronic device 101.

According to an embodiment of the disclosure, the memory 130 may store data related to operating of a device connection function. According to an embodiment of the disclosure, when a device connection operation is performed, the data may include a string 710 obtained from the inside or the outside, and connection information 720 produced based on the communication module 190 of the electronic device 101 and the state of the communication module 190. According to an embodiment of the disclosure, the memory 130 may store the string 710 and the connection information 720 in a database and may manage the same.

According to an embodiment of the disclosure, after a predetermined period of time, the string 710 may be removed (or deleted) from the memory 130 for reusing of the string. According to an embodiment of the disclosure, if device connection of the electronic device 101 is performed within a predetermined period of time, the string 710 may be immediately deleted at the corresponding point in time. According to an embodiment of the disclosure, the connection information 720 may be adaptively updated based on an operation state related to the communication module 190 of the electronic device 101 and/or a communication scheme set by a user.

According to an embodiment of the disclosure, the memory 130 may include at least one module that is capable of being performed by the processor 120, and that is for processing a device connection function. For example, the memory 130 may include at least some modules among the string generation module 730, a state identification module 740, a string verification module 750, a string processing module 760, and/or a string parsing module 770, in the form of software (or in the form of an instruction).

According to an embodiment of the disclosure, the processor 120 may control an operation (processing) related to performing an intelligent device connection service (e.g., a device connection function) in the electronic device 101. According to an embodiment of the disclosure, when providing an intelligent device connection service, the processor 120 may control an operation related to automatically performing device connection of the electronic device 101 (e.g., device connection between the first electronic device 510 and the second electronic device 520) based on a user utterance.

According to an embodiment of the disclosure, when providing an intelligent device connection service, the processor 120 may detect initiation of device connection based on a designated user input. According to an embodiment of the disclosure, based on the detection of the initiation of device connection, the processor 120 may produce a string and connection information for connection to another electronic device. According to an embodiment of the disclosure, the processor 120 may output the string via a designated output module (e.g., the speaker 155 and/or the display module 160), and may transmit the string and connection information to the outside (e.g., the server 530). According to an embodiment of the disclosure, based on reception of a connection request from another electronic device, the processor 120 may perform connection to the other electronic device.

According to an embodiment of the disclosure, the when providing an intelligent device connection service, the processor 120 may receive a user utterance related to device connection to another electronic device, and may obtain a string related to the other electronic device based on the reception of the user utterance. According to an embodiment of the disclosure, the processor 120 may determine whether the user utterance and the string are identical, and if they are identical, the processor 120 may perform connection to the other electronic device based on connection information related to the other electronic device.

According to an embodiment of the disclosure, when providing an intelligent device connection service, the processor 120 may determine an operation mode of the electronic device based on a user input. According to an embodiment of the disclosure, based on determination of a first operation, the processor 120 may produce a string and connection information for device connection to another electronic device and may transmit the same to the outside, and may await, based on the connection information, a connection request from the other electronic device. According to an embodiment of the disclosure, based on reception of a connection request from the other electronic device, the processor 120 may perform connection to the other electronic device. According to an embodiment of the disclosure, based on determination of a second operation, the processor 120 may receive a user utterance and may obtain a string and connection information related to device connection to another electronic device. According to an embodiment of the disclosure, when the user utterance and the string are identical, the processor 120 may perform, based on the connection information, connection to the other electronic device.

According to an embodiment of the disclosure, the processor 120 may include at least one module for processing a voice-based device connection function. For example, the processor 120 may include the string generation module 730, the state identification module 740, the string verification module 750, the string processing module 760, and/or the string parsing module 770.

According to an embodiment of the disclosure, the string generation module 730 may produce a unique string. According to an embodiment of the disclosure, the string generation module 730 may produce a string corresponding to a user utterance, may obtain a string from the server 530 (e.g., the string DB 630), or may obtain a string predefined in the memory 130 of the first electronic device 101.

According to an embodiment of the disclosure, the state identification module 740 may identify a connection method type available for the electronic device 101. According to an embodiment of the disclosure, the state identification module 740 may produce connection information based on a connection method type. According to an embodiment of the disclosure, based on the connection information, the state identification module 740 may determine a connection method for performing connection with another electronic device. According to an embodiment of the disclosure, based on the determined connection method, the state identification module 740 may convert the state of the electronic device 101 to the state of being connectable to another electronic device.

According to an embodiment of the disclosure, the string verification module 750 may verify a user utterance which is converted into a string (e.g., text). According to an embodiment of the disclosure, the string verification module 750 may determine whether the string associated with the user utterance is a unique string (e.g., open sesame, AZAAC, or good bye don't go) which is not defined in a designated format, such as a string produced by the first electronic device 101. For example, the string verification module 660 may verify a string including a normal command for voice recognition and a unique string for device connection.

According to an embodiment of the disclosure, if the user utterance is verified as a unique string based on the result of the verification by the string verification module 750, the string processing module 760 may provide the corresponding string to the server 530. According to an embodiment of the disclosure, the string processing module 760 may obtain, from the server 530, connection information that matches the string. According to an embodiment of the disclosure, the string processing module 760 may provide the obtained connection information to the string parsing module 770.

According to an embodiment of the disclosure, the string parsing module 770 may interpret the connection information. According to an embodiment of the disclosure, the string parsing module 770 may interpret the text or phase associated with the connection information received from the server 530 according to a designated rule (e.g., a grammatical rule), and may understand the meaning of the connection information.

According to an embodiment of the disclosure, at least part of the string generation module 730, the state identification module 740, the string verification module 750, the string processing module 760, and/or string parsing module 770 may be included in the processor 120 as a hardware module (e.g., a circuitry), or may be embodied as software including one or more instructions executable by the processor 120. For example, operations performed by the processor 120 may be stored in the memory 130, and may be executed by instructions that enable the processor 120 to perform operations when the instructions are executed.

The processor 120 according to various embodiments may control various operations associated with normal functions of the electronic device 101, in addition to the above-described functions. For example, when a designated application is executed, the processor 120 may control the operation and displaying of a screen of the designated application. As another example, the processor 120 may receive input signals corresponding to various touch event inputs or proximity event inputs supported by a touch-based input interface or a proximity-based input interface, and may control operation of corresponding functions.

According to various embodiments of the disclosure, the electronic device 101 is not limited to elements illustrated in FIG. 7, and at least one element may be omitted or added. According to an embodiment of the disclosure, the electronic device 101 may include a voice recognition module (not illustrated) (e.g., the voice assistant 650 of FIG. 6). For example, the voice recognition module (not illustrated) may be an embedded ASR (eASR) module and/or an embedded NLU (eNLU). According to an embodiment of the disclosure, the voice recognition module (not illustrated) may convert, into text data, a voice input that is associated with a user utterance and is received via the microphone 151 of the electronic device 101, and may process the converted text data inside the electronic device or may transmit the same to a server (e.g., the server 530 of FIG. 5 or FIG. 7).

According to an embodiment of the disclosure, when the electronic device 101 is a device excluding the microphone 151, the electronic device 101 may receive an input for starting a device connection service using another input device and may produce a string corresponding thereto. According to an embodiment of the disclosure, when the electronic device 101 is a device excluding the display module 160 or is in an operation mode (e.g., a mobile driving mode) that restricts use of the display module 160, the electronic device 101 may output a string in an audio format according to a text to speech (TTS) manner, so as to provide the same to a user.

According to an embodiment of the disclosure, the electronic device 101 or the server 530 may include a voice recognition device (e.g., a voice assistant) for supporting a voice-based device connection service according to various embodiments of the disclosure, and the electronic device 101 or the server 530, as a single entity, may process various embodiments of the disclosure.

According to an embodiment of the disclosure, the electronic device 101 may embody a voice recognition device (e.g., a voice assistant) including elements for voice recognition processing of the server 530 as illustrated in FIG. 2, FIG. 5, or FIG. 6, and may perform voice recognition processing in a standalone manner without interoperation with the server 530.

According to another embodiment of the disclosure, the server 530 may include, for example, at least some elements among the string generation module 730, the state identification module 740, the string verification module 750, the string processing module 760, and/or the string parsing module 770 illustrated in FIG. 7, so as to embody a voice recognition device (e.g., a voice assistant), may solely process a voice signal related to an utterance transferred from the electronic device 101, and may provide, to the electronic device 101, a response result thereto.

A voice recognition device (e.g., a voice assistant) and/or at least some modules among the various modules for processing device connection according to various embodiments may be embodied as a hardware module or a software module, and may be embodied in the form of being contained in the electronic device 101 or the server 530, and operations associated with various embodiments may be processed by any one element (e.g., the electronic device 101 or the server 530) including the voice recognition device.

According to an embodiment of the disclosure, a device for producing a string, a device for comparing strings, and/or a device for storing a string may be included in the server 530 or the electronic device 101 according to the condition of the corresponding electronic device. A device for recognizing a user utterance and converting the user utterance into a string is also included in the server 530 or the electronic device 101.

Various embodiments described in the disclosure may be implemented in a computer or similar device readable recording medium using software, hardware or a combination thereof.

According to various embodiments of the disclosure, there is provided a computer readable recording medium that stores a program for implementing operations including an operation of determining an operation mode of an electronic device based on a user input, an operation of producing, based on determining of a first operation, a string and connection information for device connection to another electronic device and transmitting the string and connection information to the outside, an operation of awaiting reception of a connection request from the other electronic device based on the connection information, and an operation of performing connection to the other electronic device based on reception of the connection request, an operation of receiving, based on determining of a second operation, a user utterance, an operation of obtaining a string and connection information related to device connection to another electronic device, and an operation of performing connection to the other electronic device based on the connection information if the user utterance and the string are identical.

According to various embodiments of the disclosure, the electronic device 101 for supporting device connection based on voice recognition may include the communication module 190, an output module (e.g., the speaker 155 and/or the display module 160), the memory 130, and the processor 120 operatively connected to the communication module 190, the output module, and the memory 130, and the processor 120 may be configured to detect initiation of device connection based on a designated user input, to produce a string and connection information for connection to another electronic device, to output the string via the output module, to transmit the string and connection information to the outside, and based on reception of a connection request from the other electronic device, to connect the other electronic device.

According to an embodiment of the disclosure, the designated user input may include an input method for initiating a device connection operation based on a user utterance input, a button input configured to provide a designated command in the electronic device 101, a screen touch input, a gesture control input associated with the electronic device 101, and/or a control signal input using a remote control device.

According to an embodiment of the disclosure, the processor 120 may be configured to detect initiation of device connection based on a first utterance of a user, and to produce a string related to connection to the other electronic device based on a second utterance of the user.

According to an embodiment of the disclosure, the processor 120 may be configured to produce the string based on a user utterance input, or by selecting a string from at least one string stored in advance in the memory or by obtaining a string from a server.

According to an embodiment of the disclosure, the processor 120 may be configured to output the string and information related to the string as auditory information and/or visual information via the output module.

According to an embodiment of the disclosure, the processor 120 may be configured to identify the state of the electronic device 101 and to produce the connection information based on the identification of the state.

According to an embodiment of the disclosure, the processor 120 may be configured to determine a type of device-to-device connection method available for the electronic device 101, and to produce corresponding connection information based on the type of connection method.

According to an embodiment of the disclosure, the electronic device 101 for supporting device connection based on voice recognition may include the communication module 190, the microphone 151, the memory 130, and the processor 120 operatively connected to the communication module 190, the microphone 151, and the memory 130, and the processor 120 may be configured to receive a user utterance related to device connection to another electronic device, to obtain a string related to the other electronic device based on the reception of the user utterance, to determine whether the user utterance and the string are identical, and if the user utterance and the string are identical, to perform connection to the other electronic device based on connection information related to the other electronic device.

According to an embodiment of the disclosure, the processor 120 may be configured to obtain, based on the user utterance, a string and connection information related to device connection to the other electronic device, and based on matching between the user utterance and the string, if the user utterance and the string are identical, to determine a connection method for performing connection to the other electronic device based on the connection information.

According to an embodiment of the disclosure, the processor 120 may be configured to change, based on the determined connection method, the state of the electronic device 101 to the state of being connectable to the other electronic device.

According to an embodiment of the disclosure, the processor 120 may be configured to obtain a string related to the other electronic device from the other electronic device, the server 530, or the memory 130.

According to an embodiment of the disclosure, the processor 120 may be configured to obtain a string related to the other electronic device from the server 530, and if the user utterance and the string are identical, to obtain the connection information that matches the string from the server 530.

According to an embodiment of the disclosure, the processor 120 may be configured to receive the user utterance, to transmit the user utterance to the server 530, and based on identification by the server 530 that the user utterance is identical to a designated string, to obtain the connection information that matches the user utterance from the server 530.

According to an embodiment of the disclosure, the processor 120 may be configured to wake up based on a designated user input for initiation of voice recognition, to receive a user utterance related to a string produced by the other electronic device, and to verify the user utterance.

According to an embodiment of the disclosure, the processor 120 may be configured to verify whether the string associated with the user utterance is a unique string that is not defined in a designated form.

According to various embodiments of the disclosure, the electronic device 101 for supporting device connection based on voice recognition may include the communication module 190, the input module 150, an output module (e.g., the speaker 155 and/or display module 160), the memory 130, and the processor 120. According to an embodiment of the disclosure, the processor 120 may be configured to determine an operation mode of the electronic device 101 based on a user input, to produce, based on determining of a first operation, a string and connection information for device connection to another electronic device and to transmit the string and connection information to the outside, to await reception of a connection request from the other electronic device based on the connection information, and to perform connection to the other electronic device based on reception of the connection request. According to an embodiment of the disclosure, the processor 120 may be configured to receive, based on determining of a second operation, a user utterance, to obtain a string and connection information related to device connection to another electronic device, and to perform connection to the other electronic device based on the connection information if the user utterance and the string are identical.

Hereinafter, an operation method of the electronic device 101 according to various embodiments will be described. According to various embodiments of the disclosure, the operations performed by the electronic device 101 may be performed by a processor (e.g., the processor 120 of FIG. 1 or FIG. 7) including at least one processing circuitry of the electronic device 101. According to an embodiment of the disclosure, the operations performed by the electronic device 101 may be performed by instructions that are stored in the memory 130 and cause the processor 120 to perform operation when the instructions are performed.

Figure 8:
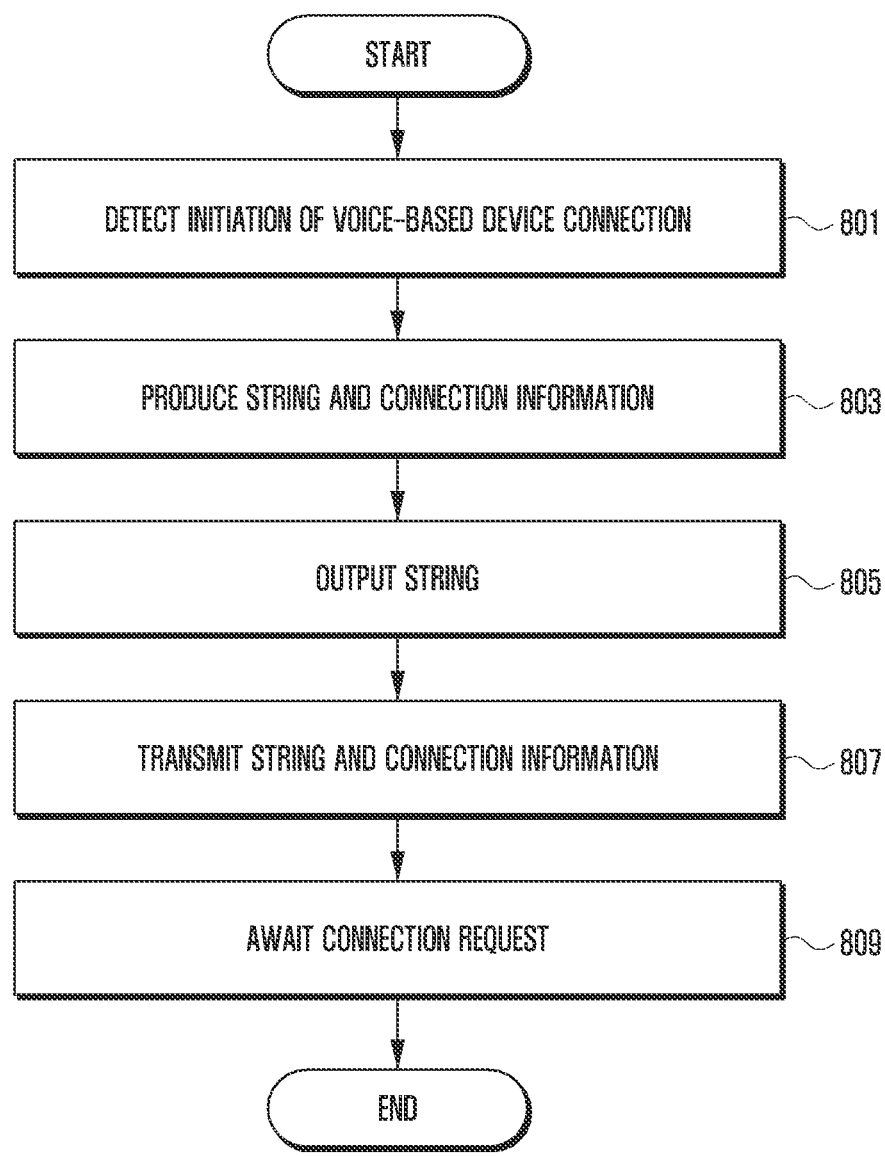
FIG. 8 is a flowchart illustrating a method of an electronic device according to an embodiment of the disclosure.

FIG. 8 is a flowchart illustrating an operation method of an electronic device according to an embodiment of the disclosure.

According to an embodiment of the disclosure, FIG. 8 illustrates an operation example in which the electronic device 101, for example, operates as the first electronic device 510 of FIG. 5 or FIG. 6, and supports a device connection service according to the operation of the first electronic device 510. For example, in FIG. 8, the electronic device 101 determines, based on a user input, a first operation mode among operation modes (e.g., a first operation mode and a second operation mode) of the electronic device 101, may produce, based on the first operation mode, a string and connection information for supporting connection to another electronic device and may transmit the same to the outside, and may perform, based on the connection information, connection to the other electronic device based on reception of a connection request from the other electronic device.

Referring to FIG. 8, in operation 801, the processor 120 of the electronic device 101 may detect initiation of device connection based on a voice. According to an embodiment of the disclosure, when initiating a device connection service, a user may command the electronic device 101 to initiate a device connection operation based on a designated input method among various input methods (e.g., a voice, a button, a touch, or a gesture) for initiating the device connection operation.

According to an embodiment of the disclosure, the user may perform user input, such as a designated command utterance for initiating a device connection operation, a designated button input (e.g., a hardware button), a screen touch input, a gesture (motion) control input associated with the electronic device 101, and/or a control signal input using a remote control device. According to an embodiment of the disclosure, the processor 120 may detect the initiation of the device connection operation based on detecting a designated command associated with a user input.

In operation 803, the processor 120 may produce a string and connection information based on the detection of the initiation of the device connection operation.

According to an embodiment of the disclosure, the processor 120 may produce a string for device connection between the electronic device 101 and another electronic device. According to an embodiment of the disclosure, the processor 120 may produce a string related to device connection based on a string corresponding to a user utterance received from a user, a string selected from among at least one string stored in advance in the memory 130, or a string obtained from the server 530 (e.g., received from the server 530 based on a request).

According to an embodiment of the disclosure, the processor 120 may produce connection information based on the communication module 190 of the electronic device 101 and/or the set state of the communication module 190. For example, the processor 120 may determine the type of device-to-device connection method available for the electronic device 101, and may produce connection information corresponding to the type of connection method.

According to an embodiment of the disclosure, the connection information may include, based on the type of connection method, a Wi-Fi on/off state, a Bluetooth on/off state, a signal strength, Wi-Fi connection state information (e.g., network information or state information associated with whether another electronic device is connected), Bluetooth connection state information, Bluetooth media access control (MAC) address information, Wi-Fi MAC address information, a service set identifier (SSID), a password, a code, and/or model information (e.g., a model name) of a communication module to be connected, and/or the identifier (e.g., a device identifier and/or a device name) of the electronic device 101.

In operation 805, the processor 120 may output a string. According to an embodiment of the disclosure, the processor 120 may output a string and information related to the string to the outside in an output scheme designated based on the type of the electronic device 101 (e.g., whether a speaker and/or a display module is included), so as to provide the same to a user. According to an embodiment of the disclosure, the designated output scheme may include an auditory information (e.g., audio) output and/or visual information (e.g., text, an image, and/or video) output. According to an embodiment of the disclosure, the string may be a unique string for supporting device connection of the electronic device 101.

In operation 807, the processor 120 may control the communication module 190 so as to transmit the string and connection information to the outside (e.g., the server 530). According to an embodiment of the disclosure, the output operation in operation 805 and the transmission operation in operation 807 are not limited to the order of operations illustrated in the drawing and may be performed in parallel, sequentially, reverse sequentially, or heuristically.

In operation 809, the processor 120 may transmit the string and connection information, and may await a connection request from the other electronic device. According to an embodiment of the disclosure, based on reception of the connection request from the other electronic device, the processor 120 may start connection between the electronic device 101 and the other electronic device. According to an embodiment of the disclosure, the processor 120 may receive the connection request based on the connection information from the other electronic device, and may immediately perform connection to the other electronic device via a communication module (or communication scheme) designated based on the connection request associated with the connection information.

Figure 9:
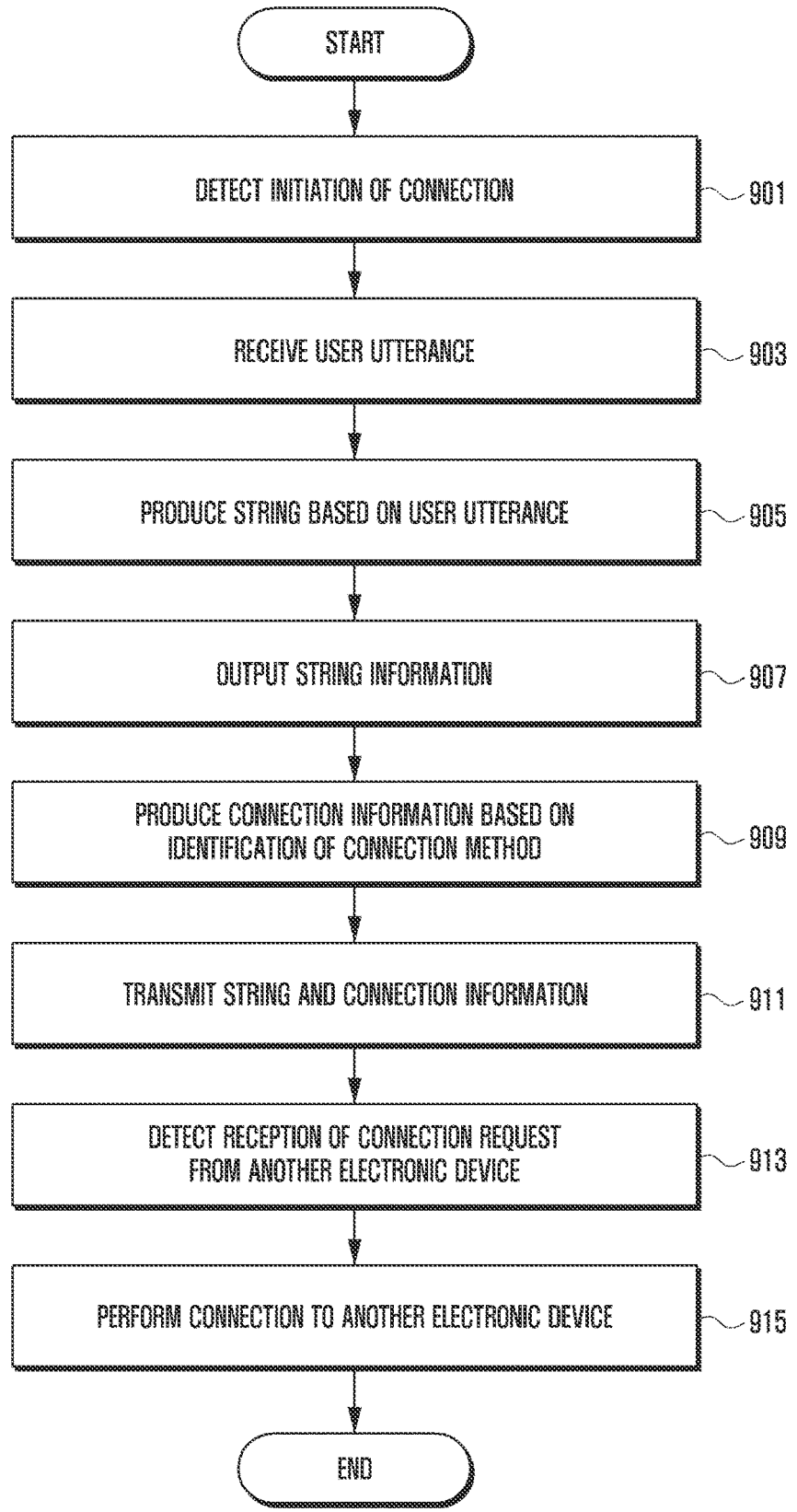
FIG. 9 is a flowchart illustrating a method of an electronic device according to an embodiment of the disclosure.

FIG. 9 is a flowchart illustrating an operation method of an electronic device according to an embodiment of the disclosure.

According to an embodiment of the disclosure, FIG. 9 illustrates an operation example in which the electronic device 101, for example, operates as the first electronic device 510 of FIG. 5 or FIG. 6, and supports a device connection service according to the operation of the first electronic device 510. For example, in FIG. 9, the electronic device 101 determines, based on a user input, a first operation mode among operation modes (e.g., a first operation mode and a second operation mode) of the electronic device 101, may produce, based on the first operation mode, a string and connection information for supporting connection to another electronic device and may transmit the same to the outside, and may perform, based on the connection information, connection to the other electronic device based on reception of a connection request from the other electronic device.

Referring to FIG. 9, in operation 901, the processor 120 of the electronic device 101 may detect initiation of device connection based on a voice. According to an embodiment of the disclosure, a user may perform user input, such as a designated command utterance for initiating a device connection operation, a designated button input (e.g., a hardware button), a screen touch input, a gesture (motion) control input associated with the electronic device 101, and/or a control signal input using a remote control device. According to an embodiment of the disclosure, the processor 120 may detect the initiation of the device connection operation based on detecting a designated command associated with a user input.

In operation 903, the processor 120 may receive a user utterance based on the detection of the initiation of the device connection operation. According to an embodiment of the disclosure, the processor 120 may recognize wake-up based on the detection of the initiation of the device connection operation, may execute a voice assistant based on the wake-up, and may obtain an audio stream (or a voice signal) associated with a user utterance when the user inputs an utterance via the voice assistant.

In operation 905, the processor 120 may produce a string based on the reception of the user utterance. According to an embodiment of the disclosure, the processor 120 may convert the audio stream associated the user utterance into text, and may use the converted text as a string. According to an embodiment of the disclosure, the processor 120 may detect, based on a first utterance of the user, wake-up and the initiation of device connection, and may perform, based on a second utterance, an operation so as to produce a string related to connection to another electronic device.

In operation 907, the processor 120 may output string information. According to an embodiment of the disclosure, the processor 120 may string information including a string and information related to the string to the outside in an output scheme designated based on the type of the electronic device 101 (e.g., whether a speaker and/or a display module is included), so as to provide the same to the user. According to an embodiment of the disclosure, the designated output scheme may include an auditory information (e.g., audio) output and/or visual information (e.g., text, an image, and/or video) output. According to an embodiment of the disclosure, the processor 120 may display the converted text and guide information via the display module 160, and/or may convert the converted text and guide information into a reproducible audio stream (e.g., according to TSS) and may output the same to the speaker 155.

In operation 909, the processor 120 may produce connection information based on identification of the connection method of the electronic device 101. According to an embodiment of the disclosure, the processor 120 may produce connection information based on the communication module 190 of the electronic device 101 and/or the set state of the communication module 190. For example, the processor 120 may determine the type of device-to-device connection method available for the electronic device 101, and may produce connection information corresponding to the type of connection method.

According to an embodiment of the disclosure, the connection information may include, based on the type of connection method, a Wi-Fi on/off state, a Bluetooth on/off state, a signal strength, Wi-Fi connection state information (e.g., network information or state information associated with whether another electronic device is connected), Bluetooth connection state information, Bluetooth MAC address information, Wi-Fi MAC address information, an SSID, a password, a code, and/or model information (e.g., a model name) of a communication module to be connected, and/or the identifier (e.g., a device identifier and/or a device name) of the electronic device 101.

According to an embodiment of the disclosure, the output operation in operation 907 and the production operation in operation 909 are not limited to the order of operations illustrated in the drawing, and may be performed in parallel, sequentially, reverse sequentially, or heuristically.

In operation 911, the processor 120 may control the communication module 190 so as to transmit the string and connection information to the outside (e.g., the server 530).

In operation 913, the processor 120 may transmit the string and connection information, and may detect reception of a connection request from the other electronic device. According to an embodiment of the disclosure, the processor 120 may transmit the string and connection information, and may await reception of a connection request from the other electronic device during a predetermined period of time.

In operation 915, based on reception of the connection request from the other electronic device, the processor 120 may perform connection between the electronic device 101 and the other electronic device. According to an embodiment of the disclosure, the processor 120 may receive the connection request based on the connection information from the other electronic device, and may immediately perform connection to the other electronic device via a communication module (or communication scheme) designated based on the connection request associated with the designated connection information.

According to various embodiments of the disclosure, as illustrated in FIGS. 8 and 9, the user may perform device connection based on a voice, or the user may perform device connection using a designated button or menu of the electronic device 101. According to an embodiment of the disclosure, if a user performs device connection based on a voice, the electronic device 101 may analyze a user utterance and may identify another electronic device to be connected.

According to an embodiment of the disclosure, the user may input an utterance "Please transmit a video file to my tablet PC" that includes a device to be connected. When detecting a user utterance, the electronic device 101 may convert the user utterance into natural language text, independently or via interoperation with a server. The electronic device 101 may process and predict a natural language text obtained via conversion. For example, via the processing and prediction of the natural language obtained via conversion, the electronic device 101 may identify that the user utterance corresponds to device connection, that a device (e.g., another electronic device) to be connected is a tablet PC of the user, and that the intention of the user utterance is to transmit a video file to the tablet PC via device connection. For example, the electronic device 101 may predict the user's intention of performing device connection between the electronic device 101 and the table PC and transmitting a video file to the table PC.

According to an embodiment of the disclosure, as device connection is initiated, the electronic device 101 may produce a designated string (e.g., open sesame) and information (e.g., guide information) related to the string including information associated with a device to be connected, and may output the string via an output module of the electronic device 101 (e.g., the speaker 155 and/or display module 160). For example, the electronic device 101 may output string information read as "Please say open sesame to a table PC!"

According to an embodiment of the disclosure, the electronic device 101 may transmit the produced string to the server 530, and/or may transfer the produced string to another neighboring electronic device via broadcasting, so as to register the string of the electronic device 101 with the outside.

According to another embodiment of the disclosure, the user may input an utterance "Please send a video file" that excludes a device to be connected. When detecting a user utterance, the electronic device 101 may convert the user utterance into natural language text, independently or via interoperation with a server. The electronic device 101 may process and predict a natural language text obtained via conversion. For example, via processing and prediction of the natural language obtained by conversion, the electronic device 101 may identify that the user utterance corresponds to device connection and intends to transmit a video file via device connection to a device to be connected. For example, the electronic device 101 may predict that the user intends to perform device connection between the electronic device 101 and another electronic device, and to transmit a video file to the other electronic device.

According to an embodiment of the disclosure, as device connection is initiated, the electronic device 101 may produce a designated string (e.g., open sesame) and information (e.g., guide information) related to the string excluding information associated with a device to be connected, and may output the string via an output module of the electronic device 101 (e.g., the speaker 155 and/or display module 160). For example, the electronic device 101 may output string information read as "Please say open sesame to a device desired to be connected!"

According to an embodiment of the disclosure, the electronic device 101 may transmit the produced string to the server 530, and/or may transfer the produced string to another neighboring electronic device via broadcasting, so as to register the string of the electronic device 101 with the outside.

According to another embodiment of the disclosure, if the electronic device 101 is capable of recognizing a speaker (e.g., identification and verification), one of a plurality of electronic devices registered in advance by a user that inputs an utterance (e.g., electronic devices grouped based on a user account) may be selected in advance as an electronic device to be connected. According to an embodiment of the disclosure, according to a method that includes a corresponding voice identifier (voice ID) in device connection information produced in the first electronic device 510, and compares the voice ID and a voice ID associated with a user utterance input to the second electronic device 520, an electronic device to be connected via device connection may differ depending on a speaker, although an identical string is used.

Figure 10A:
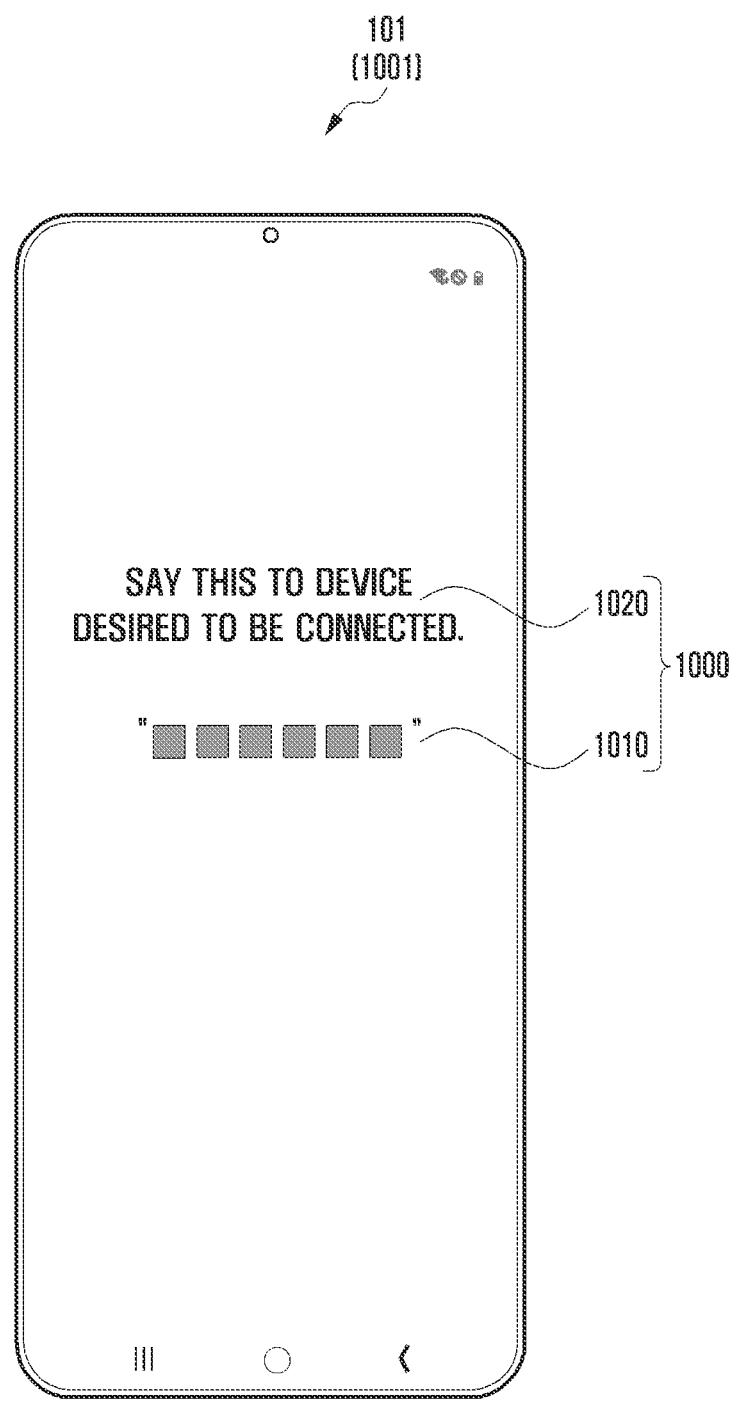
FIGS. 10A, 10B, and 10C are diagrams illustrating outputting connection information by an electronic device according to various embodiments of the disclosure.
Figure 10B:
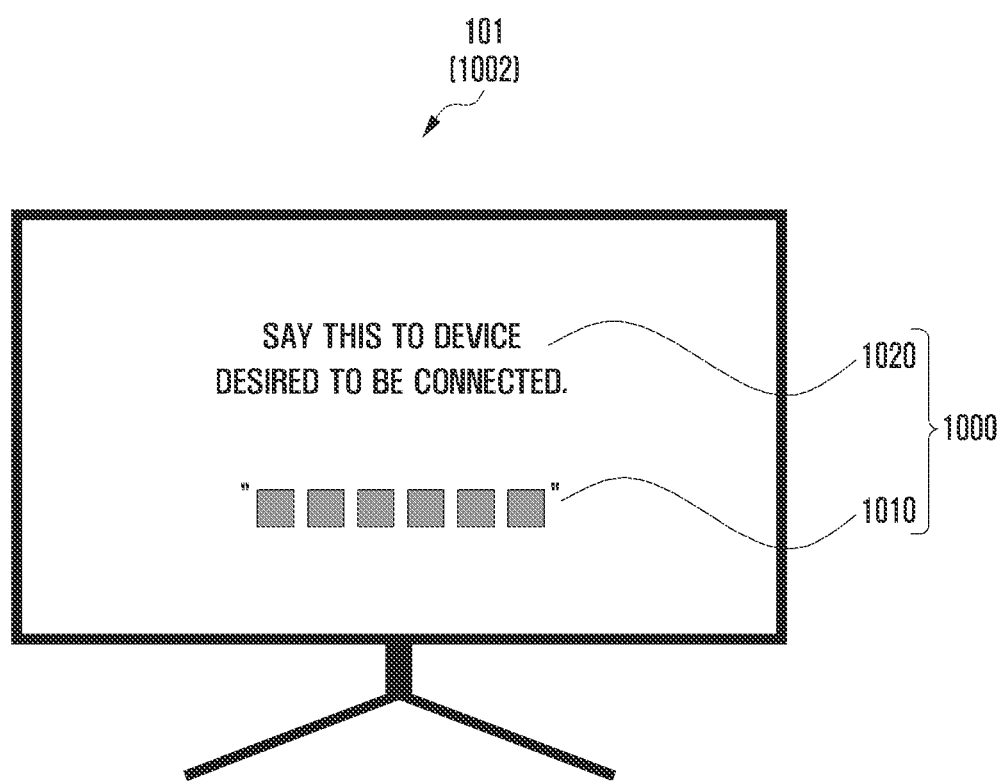
Figure 10C:
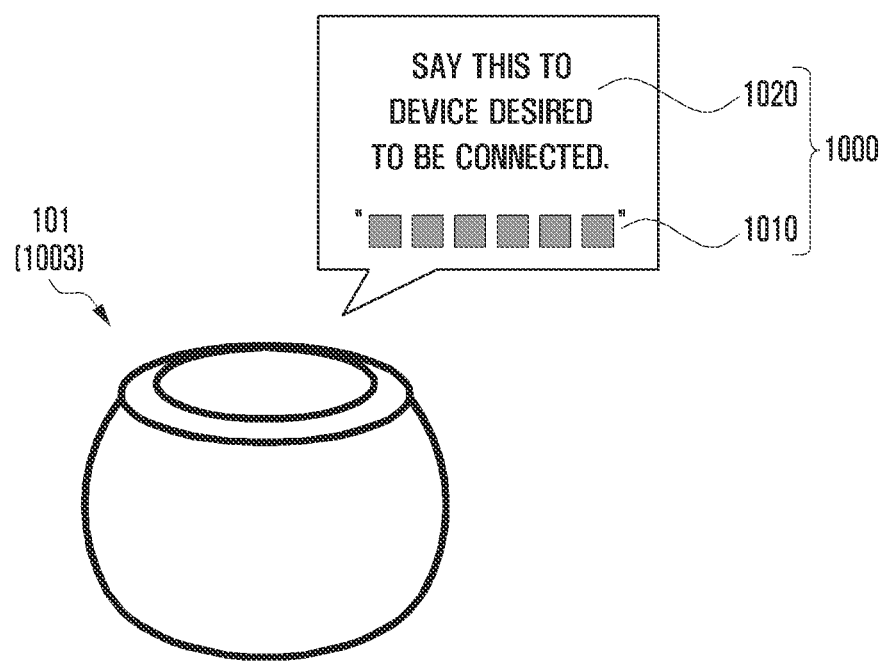

FIGS. 10A, 10B, and 10C are diagrams illustrating outputting connection information by an electronic device according to various embodiments of the disclosure.

Referring to FIGS. 10A, 10B, and 10C, various examples of outputting string information 1000 based on the type of the electronic device 101 in the electronic device 101 are illustrated.

According to an embodiment of the disclosure, the string information 1000 may include a string 1010 and information 1020 related to the string 1010. According to an embodiment of the disclosure, if it is assumed that the string information 1000 is <Please say 'open sesame' to a device to be connected.>, 'Please say to a device to be connected.' may be information 1020 related to the string (e.g., guide information associated with a device connection method provided to a user), and 'open sesame' may be a unique string 1010 for supporting device connection of the electronic device 101.

According to an embodiment of the disclosure, FIG. 10A illustrates that the type of the electronic device 101 is a first electronic device 1001 (e.g., a smartphone) including the speaker 155 and the display module 160, FIG. 10B illustrates that the type of the electronic device 101 is a second electronic device 1002 (e.g., a display device (e.g., a TV or monitor)) including the speaker 155 and the display module 160, and FIG. 10C illustrates that the type of the electronic device 101 is a third electronic device 1003 (e.g., a smart speaker) including only the speaker 155 and excluding the display module 160.

According to an embodiment of the disclosure, referring to FIGS. 10A and 10B, the electronic device 101 (e.g., the first electronic device 1001 and the second electronic device 1003) including the speaker 155 and the display module 160 may output the string information 1000 via the speaker 155 and/or display module 160. According to an embodiment of the disclosure, the electronic device 101 may provide the string information 1000 to the user by outputting the same as a sound (e.g., a voice) via the speaker 155, and/or displaying the same on a screen via the display module 160. For example, the electronic device 101 may output <Please say 'open sesame' to a device to be connected.> as auditory information and/or visual information.

According to an embodiment of the disclosure, referring to FIG. 10C, the electronic device 101 (e.g., the third electronic device 1003) excluding the display module 160 may output the string information 1000 via the speaker 155. According to an embodiment of the disclosure, the electronic device 101 may output the string information 1000 via the speaker 155 as a sound (e.g., a voice). For example, the electronic device 101 may output <Please say 'open sesame' to a device to be connected.> as auditory information.

According to an embodiment of the disclosure, when the electronic device 101 is a device excluding the display module 160 or in an operation mode (e.g., a mobile driving mode) that restricts use of display module 160, the electronic device 101 may output the string information 1000 in an audio format according to a text to speech (TTS) manner, so as to provide the same to a user.

According to an embodiment of the disclosure, the electronic device 101 may be a device including an output module (e.g., the speaker 155 and the display module 160), may determine an output scheme that is capable of outputting the string information 1000 in an environment that restricts use of any one of the modules (e.g., the speaker 155 or the display module 160), and may provide the string information 1000 to the user based on the determined output scheme.

According to an embodiment of the disclosure, in an environment that restricts use of the speaker 155 (e.g., the volume level of the speaker 155 is less than or equal to a designated level (e.g., approximately 0 level)) and allows use of the display module 160, the electronic device 101 may display the string information 1000 on a screen and may provide the same to the user.

According to an embodiment of the disclosure, when the display module 160 is in an operation mode (e.g., a mobile driving mode) that restricts the use of the display module 160 and use of the speaker is allowed, the electronic device 101 may output, to the user, the string information 1000 in an audio format according to a TTS scheme.

According to an embodiment of the disclosure, when use of all output modules (e.g., the speaker 155 and the display module 160) is allowed, the electronic device 101 may provide the string information 100 by simultaneously displaying the same on a screen and outputting the same in the audio format, or may output using any one of them according to priority.

According to an embodiment of the disclosure, if use of all the output modules (e.g., the speaker 155 and the display 160) is restricted, the electronic device 101 may inform the user of an error situation via a designated alarm (e.g., vibration or the flicker of a lamp).

Figure 11:
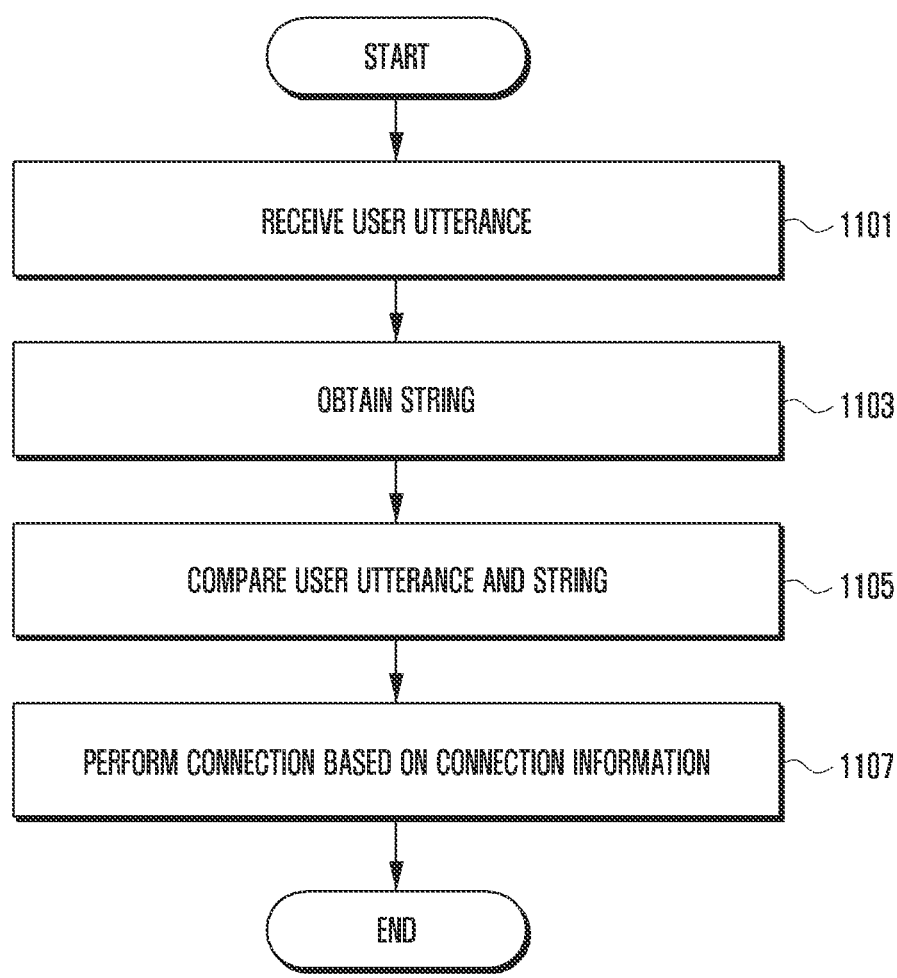
FIG. 11 is a flowchart illustrating a method of an electronic device according to an embodiment of the disclosure.

FIG. 11 is a flowchart illustrating an operation method of an electronic device according to an embodiment of the disclosure.

According to an embodiment of the disclosure, FIG. 11 illustrates an operation example in which the electronic device 101, for example, operates as the second electronic device 520 of FIG. 5 or FIG. 6, and supports a device connection service according to the operation of the second electronic device 520. For example, in FIG. 11, the electronic device 101 may determine, based on a user input, a second operation mode among operation modes (e.g., a first operation mode and a second operation mode) of the electronic device 101, may obtain, based on the second operation mode, a string and connection information related to connection to another electronic device, may match the string based on a user utterance, and may perform connection to the other electronic device based on the connection information when the user utterance and the string are identical. According to an embodiment of the disclosure, FIG. 11 illustrates an example in which the electronic device 101 processes device connection in an on-device state.

Referring to FIG. 11, in operation 1101, the processor 120 of the electronic device 101 may receive a user utterance. According to an embodiment of the disclosure, the processor 120 may receive a voice signal (or an audio stream) related to the user utterance via the microphone 151. According to an embodiment of the disclosure, the processor 120 may recognize wake-up based on a designated user utterance, and may perform a voice assistant based on the wake-up. According to an embodiment of the disclosure, if a user inputs a designated user utterance via the voice assistant, the processor 120 may obtain a voice signal associated with the user utterance.

According to an embodiment of the disclosure, the user may input a user utterance via the microphone 151 of the electronic device 101. According to an embodiment of the disclosure, the user may identify a string (e.g., open sesame) output from another electronic device, and may provide an utterance (e.g., open sesame) corresponding to the identified string. According to an embodiment of the disclosure, the user may wake up the electronic device 101 based on a designated user input for initiating voice recognition, and may utter a string with respect to the electronic device 101. According to an embodiment of the disclosure, the user input may include an input via a designated button for wake-up and/or an input via a designated voice command.

In operation 1103, the processor 120 may obtain a string based on the reception of the user utterance. According to an embodiment of the disclosure, the processor 120 may obtain a string by calling a string registered inside (e.g., the memory 130) or by requesting and receiving a string registered outside (e.g., server 530).

In operation 1105, the processor 120 may compare the user utterance and the string. According to an embodiment of the disclosure, the processor 120 may convert an audio stream associated with the user utterance into text, and may determine whether the text obtained via conversion (e.g., a first string) and the obtained string (e.g., a second string) are identical via matching. According to an embodiment of the disclosure, the processor 120 may compare the first string produced by the electronic device 101 and the second string produced and obtained from the other electronic device, and may determine whether the first string and the second string are identical.

According to an embodiment of the disclosure, based on the reception of the user utterance, the processor 120 may transmit the string (e.g., text) associated with the received user utterance to the server 530, so that the server 530 compare the strings. According to an embodiment of the disclosure, based on the reception of the user utterance after wake-up, the electronic device 101 may analyze (or verify) the user utterance, and if the user utterance is related to device connection, the electronic device 101 may request the server 530 to provide a string (e.g., text) associated with the user utterance and connection information that matches the string.

In operation 1107, if whether the user utterance (e.g., the first string) and the identified string (e.g., the second string) are identical is determined based on a result of comparison of them, the processor 120 may perform connection to the other electronic device based on the connection information related to the other electronic device. According to an embodiment of the disclosure, the processor 120 may obtain connection information by calling connection information that matches the second string registered inside (e.g., the memory 130) or by requesting and receiving connection information that matches the second string registered outside (e.g., server 530).

According to an embodiment of the disclosure, the processor 120 may convert (or change) the electronic device 101 to the state of being connectable to the other electronic device based on the connection information of the other electronic device, and subsequently, may start connection to the other electronic device based on the connection information. According to an embodiment of the disclosure, the processor 120 may determine an optimal connection method based on the connection information of the other electronic device, may change the device state of the electronic device 101 (e.g., activate a corresponding communication module) based on the determined connection method, and may perform connection to the other electronic device based on the connection information.

Figure 12:
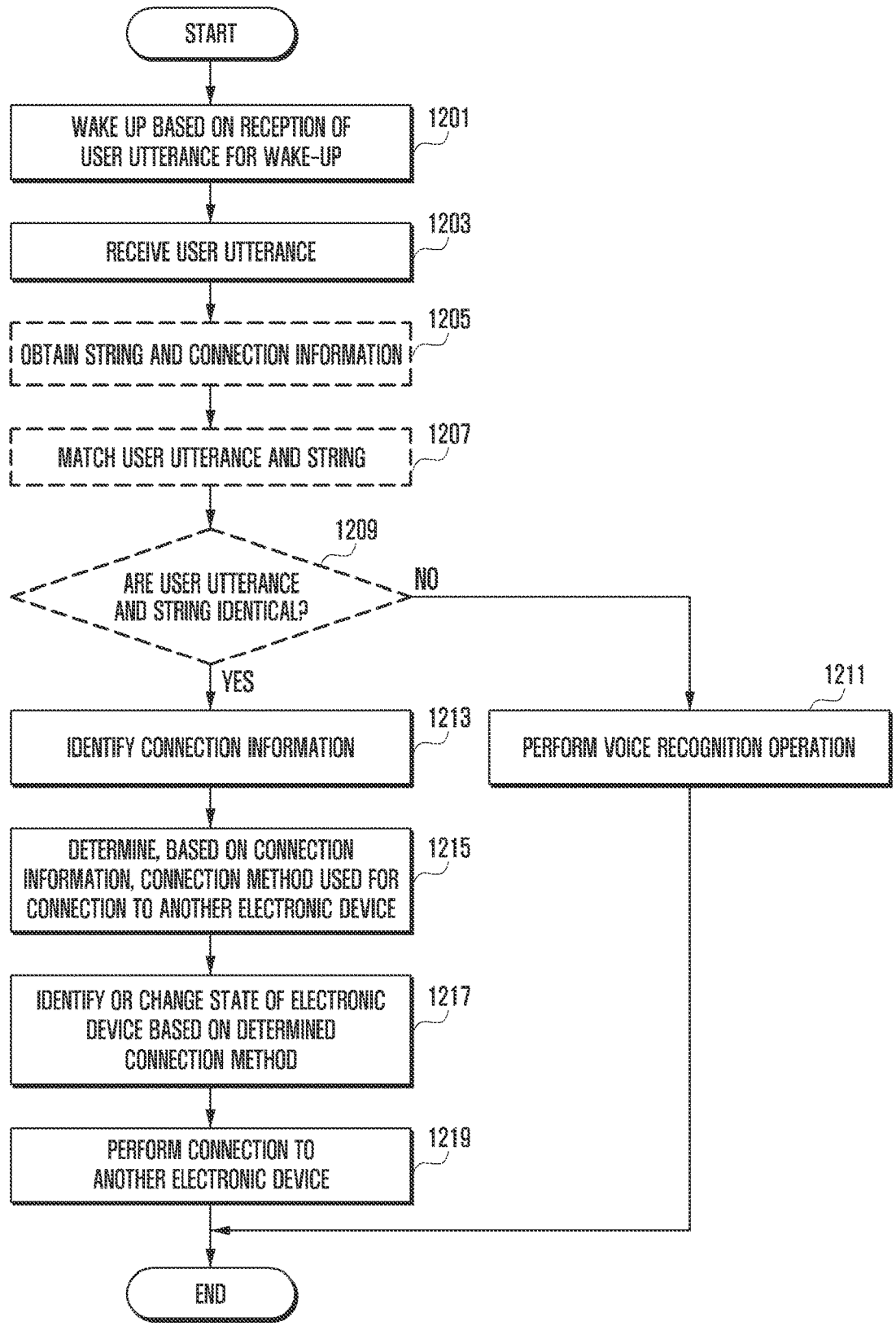
FIG. 12 is a flowchart illustrating a method of an electronic device according to an embodiment of the disclosure.

FIG. 12 is a flowchart illustrating a method of an electronic device according to an embodiment of the disclosure.

Referring to FIG. 12, it illustrates an operation example in which the electronic device 101, for example, operates as the second electronic device 520 of FIG. 5 or FIG. 6, and supports a device connection service according to the operation of the second electronic device 520. For example, in FIG. 12, the electronic device 101 may determine, based on a user input, a second operation mode among operation modes (e.g., a first operation mode and a second operation mode) of the electronic device 101, may obtain, based on the second operation mode, a string and connection information related to connection to another electronic device, may match the string based on a user utterance, and may perform connection to the other electronic device based on the connection information when the user utterance and the string are identical. According to an embodiment of the disclosure, FIG. 12 illustrates an example in which the electronic device 101 processes device connection in an on-device state.

Referring to FIG. 12, in operation 1201, the processor 120 of the electronic device 101 may wake up based on reception of a user utterance for wake-up (e.g., a first utterance based on a wake-up command). According to an embodiment of the disclosure, the processor 120 may receive a voice signal (or an audio stream) related to a user utterance via the microphone 151.

According to an embodiment of the disclosure, the processor 120 may recognize wake-up based on a designated user utterance, and may perform a voice assistant based on the wake-up. According to an embodiment of the disclosure, a designated user input for wake-up (or for initiation of voice recognition) of the electronic device 101 may be performed by a designated voice command input (e.g., a user utterance) and/or a designated button of the electronic device 101 for wake-up.

In operation 1203, the processor 120 may receive a user utterance (e.g., a second utterance associated with a designated unique string for device connection). According to an embodiment of the disclosure, if a user inputs a designated user utterance via the voice assistant, the processor 120 may obtain a voice signal associated with the user utterance. According to an embodiment of the disclosure, the user may identify a string (e.g., open sesame) output from the other electronic device, and may provide an utterance (e.g., open sesame) corresponding to the identified string.

In operation 1205, the processor 120 may obtain a string and connection information based on reception of the user utterance (e.g., the second utterance). According to an embodiment of the disclosure, the processor 120 may obtain a string and connection information by calling a string and connection information registered inside (e.g., the memory 130) or by requesting and receiving a string and connection information registered outside (e.g., server 530). According to an embodiment of the disclosure, when the electronic device 101 supports device connection by interoperation with the server 530, the processor 120 may transmit a string (text obtained via conversion) corresponding to the user utterance to the server 530, and may obtain connection information that matches the string from the server 530.

In operation 1207, the processor 120 may match the user utterance and the string. According to an embodiment of the disclosure, the processor 120 may convert the audio stream associated with the user utterance into text, and may determine whether the text obtained via conversion (e.g., a first string) and the obtained string (e.g., a second string) are identical via matching. According to an embodiment of the disclosure, the processor 120 may compare the first string produced by the electronic device 101 and the second string produced and obtained from the other electronic device.

In operation 1209, the processor 120 may determine whether the user utterance and the string are identical. For example, based on a result of comparing the first string related to the electronic device 101 and the second string related to the other electronic device, the processor 120 may determine whether they are identical.

In operation 1209, when the user utterance and the string are not identical (e.g., No in operation 1209), the processor 120 may perform a voice recognition operation in operation 1211. According to an embodiment of the disclosure, when the first string and the second string are not identical, for example, when it is verified that the user utterance is not a unique string related to device connection, the processor 120 may perform a voice recognition operation with respect to the user utterance, and may provide a response result corresponding thereto.

In operation 1209, when the user utterance and the string are identical (e.g., Yes in operation 1209), the processor 120 may identify connection information in operation 1213. According to an embodiment of the disclosure, when the first string and the second string are identical, for example, when it is verified that the user utterance is a unique string related to device connection, the processor 120 may identify connection information that matches the second string. According to an embodiment of the disclosure, the processor 120 may interpret the text or phase associated with the connection information according to a designated rule (e.g., a grammatical rule), and may understand the meaning of the connection information.

In operation 1215, based on the connection information, the processor 120 may determine a connection method to be used for connecting the other electronic device. According to an embodiment of the disclosure, based on the interpreted connection information, the processor 120 may determine an optimal connection method to be used for connecting the other electronic device.

In operation 1217, the processor 120 may identify or change the state of the electronic device 101 based on the determined connection method. According to an embodiment of the disclosure, based on the determined connection method, the processor 120 may identify a communication module usable for connection to the other electronic device among various communication modules (e.g., the communication module 190 of FIG. 1) of the electronic device 101 and the state of the corresponding communication module. According to an embodiment of the disclosure, based on the connection information of the other electronic device, the processor 120 may determine an optimal connection method. Based on the determined connection method, the processor 120 may identify the state of the corresponding communication module of the electronic device 101 and may change the state when needed. For example, the processor 120 may change the device state of the electronic device 101 (e.g., activate a corresponding communication module).

According to an embodiment of the disclosure, the processor 120 may determine a Wi-Fi connection based on the fact that the Wi-Fi module of the other electronic device is in an on-state identified based on the connection information. According to an embodiment of the disclosure, when Wi-Fi connection is determined as a connection method to be used for connecting to the other electronic device, the processor 120 may identify the state (e.g., on/off state) of the Wi-Fi module of the electronic device 101. If the Wi-Fi module is in an off-state, the processor 120 may change the Wi-Fi module to an on-state. According to another embodiment of the disclosure, the processor 120 may determine Bluetooth connection based on the fact that the Bluetooth module of the other electronic device is in an on-state identified based on the connection information. According to an embodiment of the disclosure, when Bluetooth connection is determined as a connection method to be used for connecting to the other electronic device, the processor 120 may identify the state (e.g., on/off state) of the Bluetooth module of the electronic device 101. If the Bluetooth module is in an off-state, the processor 120 may change the Bluetooth module to an on-state.

In operation 1219, the processor 120 may perform connection to the other electronic device. According to an embodiment of the disclosure, the processor 120 may start connection to the other electronic device based on the connection information using a communication scheme and a communication module which correspond to the determined connection method. According to an embodiment of the disclosure, the processor 120 may change the Wi-Fi module to a connectable state, and may establish connection to the other electronic device based on Wi-Fi information (e.g., Wi-Fi MAC address information, an SSID, a password, a code, and/or the identifier of the other electronic device (e.g., a device identifier and/or device name)) related to Wi-Fi communication among connection information.

FIG. 13 is a diagram illustrating an operation of providing device connection of an electronic device according to an embodiment of the disclosure.

According to an embodiment of the disclosure, FIG. 13 illustrates an example of an operation of performing device connection between a first electronic device 510 and a second electronic device 520, using a voice of a user 500. According to various embodiment of the disclosure, the first electronic device 510 and the second electronic device 520 may be distinguished depending on an operation (or an operation mode) that performs device connection. According to an embodiment of the disclosure, in FIG. 13, the first electronic device 510 may be the electronic device 101 that initiates a device connection operation, and the second electronic device 520 may be the electronic device 101 that performs device connection with a device (e.g., the first electronic device 510) to be connected.

Referring to FIG. 13, in operation 1301, the electronic device 101 may receive a user utterance. According to an embodiment of the disclosure, the user may provide an utterance (e.g., open sesame) corresponding to a unique string to the first electronic device 510. According to an embodiment of the disclosure, the user may wake up the first electronic device 510 based on a user input (e.g., a designated button for wake-up and/or a designated voice command input) designated for initiating voice recognition in the first electronic device 510, and may provide an utterance associated with a string related to device connection of the first electronic device 510.

In operation 1303, based on the reception of the user utterance, the first electronic device 510 may transmit the user utterance to the server 530. According to an embodiment of the disclosure, when the user inputs an utterance, the first electronic device 510 may convert a voice signal associated with the user utterance into an audio stream, and may transmit the same to the server 530.

In operation 1305, the server 530 may receive the user utterance from the first electronic device 510, and may analyze the received user utterance. According to an embodiment of the disclosure, the server 530 may convert, into natural language text, the audio stream that corresponds to the user utterance and is received from the first electronic device 510, and may process the natural language text obtained via conversion, so as to determine user's intention. According to an embodiment of the disclosure, the server 530 may perform syntactic analysis (syntactic analyze) and/or semantic analysis (semantic analyze), so as to recognize user's intention. For example, the server 530 may recognize the meaning of a word extracted from the text obtained via conversion, using the linguistic traits (e.g., syntactic elements) of a morpheme or a phrase, and may determine user's intention by matching the recognized meaning of the word to the intention.

In operation 1307, the server 530 may determine device connection using a voice based on user utterance analysis. According to an embodiment of the disclosure, the server 530 may determine that the user utterance received from the first electronic device 101 has intention of performing device connection to another electronic device (e.g., the second electronic device 520).

In operation 1309, the server 530 may produce a first string based on the user utterance. According to an embodiment of the disclosure, the server 530 may produce the first string related to device connection based on the user utterance received from the first electronic device 510.

In operation 1311, the second electronic device 520 may receive a user utterance. According to an embodiment of the disclosure, when performing device connection between the first electronic device 510 and the second electronic device 520, the user may input, to the second electronic device 520, a user utterance that is identical to the user utterance (e.g., a first user utterance) input to the first electronic device 510.

In operation 1313, based on the reception of the user utterance, the second electronic device 520 may transmit the user utterance to the server 530. According to an embodiment of the disclosure, when the user inputs an utterance, the second electronic device 520 may convert a voice signal associated with the user utterance into an audio stream, and may transmit the same to the server 530.

In operation 1315, the server 530 may produce a second string based on the user utterance. According to an embodiment of the disclosure, the server 530 may produce the second string related to device connection based on the user utterance received from the second electronic device 520. According to an embodiment of the disclosure, when receiving the user utterance from the second electronic device 520, the server 530 may convert, into text, the audio stream associated with the user utterance received from the second electronic device 520, and may use the text obtained via conversion as the second string.

In operation 1317, the server 530 may compare the first string related to the first electronic device 510 and the second string related to the second electronic device 520, so as to determine whether they are identical.

In operation 1319, if the first string and the second string are identical, the server 530 may request connection information of the second electronic device 520 from the second electronic device 520.

In operation 1321, based on the reception of the connection information from the server 530, the second electronic device 520 may transmit the connection information of the second electronic device 520 to the server 530. According to an embodiment of the disclosure, the second electronic device 520 may determine the type of device-to-device connection method available for the second electronic device 520, may produce corresponding connection information based on the type of connection method, and may transmit the same to the server 530.

In operation 1323, the server 530 may receive the connection information from the second electronic device 520 and may transmit the connection information of the second electronic device 520 to the first electronic device 510.

In operation 1325, based on the reception of the connection information from the server 530, the first electronic device 510 may perform connection to the second electronic device 520 based on the connection information. According to an embodiment of the disclosure, based on the connection information of the second electronic device 520, the first electronic device 510 may switch (or change) the first electronic device 510 to the state of being connectable to the second electronic device 520, and subsequently, may start connecting the second electronic device 520 based on the connection information.

According to an embodiment of the disclosure, the first electronic device 510 may determine an optimal connection method based on the connection information of the second electronic device 520, may change the device state of the first electronic device 510 (e.g., activate a corresponding communication module) based on the determined connection method, and may perform connection to the second electronic device 520 based on the connection information.

According to an embodiment of the disclosure, as illustrated in FIG. 13, if it is identified that the strings obtained respectively from the first electronic device 510 and the second electronic device 520 are identical, the server 530 may request and obtain connection information of one of the electronic devices (e.g., the second electronic device 520) from the corresponding electronic device, and may transfer the obtained connection information to the other electronic device (e.g., the first electronic device 510), so that the first electronic device 510 and the second electronic device 520 may automatically perform connection based on the connection information.

An operation method of the electronic device 101 according to an embodiment may include an operation of determining an operation mode of an electronic device based on a user input, an operation of producing, based on determining of a first operation, a string and connection information for device connection to another electronic device and transmitting the string and connection information to the outside, an operation of awaiting reception of a connection request from the other electronic device based on the connection information, and an operation of performing connection to the other electronic device based on reception of the connection request, and based on determining of a second operation, an operation of receiving a user utterance, obtaining a string and connection information related to device connection to another electronic device, and an operation of performing connection to the other electronic device based on the connection information if the user utterance and the string are identical.

According to an embodiment of the disclosure, the first operation may include an operation of detecting initiation of device connection based on a designated user input, and an operation of outputting the string via an output module in a designated scheme.

According to an embodiment of the disclosure, the second operation may include an operation of obtaining, based on the user utterance, a string and connection information related to device connection to the other electronic device, and based on matching between the user utterance and the string, if the user utterance and the string are identical, an operation of determining a connection method for performing connection to the other electronic device based on the connection information.

According to an embodiment of the disclosure, the second operation may include an operation of changing, based on the determined connection method, the state of the electronic device to the state of being connectable to the other electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device for supporting device connection based on voice recognition, the electronic device comprising:
    a communication module;
    a microphone;
    a memory; and
    at least one processor operatively connected to the communication module, the microphone, and the memory,
    wherein the at least one processor is further configured to:
        receive a user utterance related to device connection to an external electronic device,
        obtain a first string related to the user utterance based on the reception of the user utterance,
        obtain a second string and connection information related to connection to the external electronic device,
        based on matching between the first string and the second string, determine whether the first string and the second string are identical,
        if the first string and the second string are identical, determine a connection method for performing connection to the external electronic device based on the connection information,
        based on the determined connection method, change a state of the electronic device to a state of being connectable to the external electronic device,
        perform connection to the external electronic device based on the determined connection method,
        receive the user utterance,
        transmit the first string related to the user utterance to a server, and
        based on identification by the server that the first string is identical to a designated string, obtain the connection information that matches the first string from the server.

2. The electronic device of claim 1, wherein the at least one processor is further configured to obtain the second string related to the external electronic device from the external electronic device, a server, or the memory.

3. The electronic device of claim 1, wherein the at least one processor is further configured to:
    obtain the second string related to the external electronic device from a server, and
    if the first string and the second string are identical, obtain the connection information that matches the second string from the server.

4. The electronic device of claim 1, wherein the at least one processor is further configured to:

wake up based on a designated user input for initiation of voice recognition, receive the user utterance associated with the second string produced by the external electronic device, and verify whether the first string associated with the user utterance is a unique string that is not defined in a designated form.

5. A method of operating an electronic device, the method comprising:

determining an operation mode of the electronic device based on a user input;

based on determining of a first operation, producing a string information and first connection information for device connection to an external electronic device, wherein the string information includes a string related to a user utterance for supporting device connection and guide information related to a device connection method;

transmitting a string of the string information and the first connection information to the external electronic device;

receiving a connection request associated with the first connection information from the external electronic device, performing connection to the external electronic device based on communication scheme associated with the first connection information, based on determining of a second operation, receiving a user utterance;

obtaining a first string related to the user utterance and a second string and second connection information related to connection to the external electronic device based on matching between the first string and the second string;

if the first string and the second string are identical, determining a connection method for performing connection to the external electronic device based on the second connection information;

based on the determined connection method, changing a state of the electronic device to a state of being connectable to the external electronic device; and performing connection to the external electronic device based on the determined connection method.

\* \* \* \* \*